United States Patent
Garthwaite

(10) Patent No.: US 7,620,943 B1
(45) Date of Patent: Nov. 17, 2009

(54) USING CLASS PROPERTIES TO SEGREGATE OBJECTS IN A GENERATION MANAGED BY THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 932 days.

(21) Appl. No.: 10/881,101

(22) Filed: Jun. 30, 2004

(51) Int. Cl.
*G06F 9/45* (2006.01)
*G06F 12/00* (2006.01)

(52) U.S. Cl. .................. 717/140; 717/151; 707/206

(58) Field of Classification Search ......... 717/140–161; 707/206
See application file for complete search history.

(56) References Cited

U.S. PATENT DOCUMENTS

| | | | |
|---|---|---|---|
| 4,724,521 A | 2/1988 | Carron et al. | |
| 4,797,810 A | 1/1989 | McEntee et al. | |
| 4,912,629 A | 3/1990 | Shuler, Jr. | |
| 4,989,134 A | 1/1991 | Shaw | |
| 5,088,036 A | 2/1992 | Ellis et al. | |
| 5,333,318 A | 7/1994 | Wolf | |
| 5,392,432 A | 2/1995 | Engelstad et al. | |
| 5,485,613 A | 1/1996 | Engelstad et al. | |
| 5,560,003 A | 9/1996 | Nilson et al. | |
| 5,687,370 A | 11/1997 | Garst et al. | |
| 5,801,943 A | 9/1998 | Nasburg | |
| 5,845,276 A | 12/1998 | Emerson et al. | |
| 5,845,298 A * | 12/1998 | O'Connor et al. | 707/206 |
| 5,857,210 A | 1/1999 | Tremblay et al. | |
| 5,873,104 A | 2/1999 | Tremblay et al. | |
| 5,873,105 A | 2/1999 | Tremblay et al. | |
| 5,900,001 A | 5/1999 | Wolczko et al. | |

(Continued)

FOREIGN PATENT DOCUMENTS

EP 0 904 055 A1 9/1999

(Continued)

OTHER PUBLICATIONS

Lowry, M.C.; Munro, D.S, "Safe and complete distributed garbage collection with the train algorithm", Dec. 2002, IEEE-Proceedings of Ninth International Conference on Parallel and Distributed Systems, pp. 1-8.*

(Continued)

*Primary Examiner*—Wei Y Zhen
*Assistant Examiner*—Satish Rampuria
(74) *Attorney, Agent, or Firm*—Osha • Liang LLP

(57) ABSTRACT

A garbage collector that employs the train algorithm divides object classes into a number of class groups, which are considered to have different ranks. The class group having the lowest rank, for example, may include only classes whose instances contain no references. The group of the next-higher rank may consist of classes whose instances include references only to objects that are instances of final classes whose instances include no references. The highest-rank group may include all other classes. Car sections are associated with the class groups and contain only instances of classes belonging to the class groups with which they are associated. Within each train, each car associated with a class group of a higher-rank is placed earlier in the collection order than is a car associated with a lower-rank class group.

36 Claims, 33 Drawing Sheets

U.S. PATENT DOCUMENTS

| | | | |
|---|---|---|---|
| 5,903,900 | A | 5/1999 | Knippel et al. |
| 5,930,807 | A | 7/1999 | Ebrahim et al. |
| 5,953,736 | A | 9/1999 | O'Connor et al. |
| 5,960,087 | A | 9/1999 | Tribble et al. |
| 5,999,974 | A | 12/1999 | Ratcliff et al. |
| 6,021,415 | A | 2/2000 | Cannon et al. |
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A * | 11/2000 | Azagury et al. .............. 707/206 |
| 6,173,294 | B1 | 1/2001 | Azagury et al. |
| 6,185,581 | B1 * | 2/2001 | Garthwaite ................. 707/206 |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B2 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 * | 3/2003 | Agesen et al. .............. 707/206 |
| 6,567,905 | B2 * | 5/2003 | Otis .......................... 711/170 |
| 6,640,278 | B1 | 10/2003 | Nolan et al. |
| 6,701,520 | B1 * | 3/2004 | Santosuosso et al. ........ 717/152 |
| 6,757,890 | B1 | 6/2004 | Wallman |
| 6,769,004 | B2 | 7/2004 | Barrett |
| 6,820,101 | B2 | 11/2004 | Wallman |
| 6,826,583 | B1 * | 11/2004 | Flood et al. ................. 707/206 |
| 6,868,488 | B2 | 3/2005 | Garthwaite |
| 6,892,212 | B2 | 5/2005 | Shuf et al. |
| 6,928,450 | B2 | 8/2005 | Mogi et al. |
| 6,931,423 | B2 | 8/2005 | Sexton et al. |
| 7,024,437 | B2 * | 4/2006 | Garthwaite ................. 707/206 |
| 7,225,439 | B2 * | 5/2007 | Garthwaite ................. 717/150 |
| 7,340,464 | B2 * | 3/2008 | Kelliher et al. ............... 707/10 |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Boehm et al., "Mostly Parallel Garbage Collection", 1991, accessed from http://citeseerx.ist.psu.edu/, pp. 1-8.*

Wilson, "Uniprocessor Garbage Collection Techniques", 1992, accessed from http://citeseerx.ist.psu.edu/, pp. 1-34.*

Printezis, et al., "Visualising the Train Garbage Collector", ISMM '02, 2002, pp. 50-63, Berlin, Germany.

Jones and Lins, "Garbage Collection: Algorithms for Automatic Dynamic Memory Management", 1996, pp. 167-181, John Wiley and Sons, NY.

U.S. Appl. No. 10/287,851, filed Nov. 5, 2002, Garthwaite et al.

Appel, "Simple Generational Garbage Collection and Fast Allocation", Software Practice and Experience, 19(2), 1989, 171-183.

Appel, et al., "Real-Time Concurrent Collection on Stock Multiprocessors", ACM SIGPLAN Notices, 1988.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parrallel and Distributed Computing, Aug. 1996, 5-20.

Grarup, et al., "Incremental Mature Garbage Collection", M.Sc.Thesis @ http://www.daimi.aau.jacobse/Papers, Aug. 1993.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. Of Comp. Sci., Amherst, MA.

Hudson, et al., "Adaptive Garbage Collection for Modula-3 and Small Talk", OOPSLA/ECOOP '90 Workshop on Garbage Collection in Object-Oriented Systems, Oct. 27, 1990.

Hudson, et al., "A Language—Independent Garbage Collector Toolkit", Coins Techincal Report, Sep. 1991.

Hudson, et al., "Incremental Collection of Mature Objects", Proceedings of the Int'l Workshop on Memory Managment, 1992, pp. 1-16, Springer-Verlag.

Hudson, et al., "Training Distributed Garbage: The DMOS Collector", University of St. Andrews Tech Report, 1997, 1-26.
Hudson, et al., "Garbage Collecting the World: One Car at a Time", ACM SIGPLAN Notices 32, 1997, 162-175.
Lieberman, et al., "A Real-Time Garbage Collector Based on the Lifetimes of Objects", Communications of the ACM, 1983, 26(6).
Liskov, et al., "Partitioned Garbage Collection of a Large Stable Heap", Proceedings of IWOOOS, 1996, 117-121.
Moon, "Garbage Collection in a Large Lisp System", Conference Record of the 1984 ACM Symposium on LISP and Functional Programming, Aug. 1984, 235-246, Austin, TX.
Moss, et al., "A Complete and Coarse-Grained Incremental Garbage Collection for Persisten Object Strores", Proceedings 7th Int'l Workshop on Persisten Object System, 1996, 1-13, Cape May, NJ.
Munro, et al., "Incremental Garbage Collection of a Persistent Object Store using PMOS", 3rd Int'l Workshop on Persistence and Java, 1998, 78-91, Tiburon, California.
Nettles, Scott, "Real-Time Replication Garbage Collection", Avionics Lab, Wright Research and Development Center, 1993, PDDI.
Padopoulos, "Hood: A User-Level Thread Library for Multiprogramming Multiprocessors, Thesis: The Uni. of TX", University of Texas, Aug. 1998, 1-71, Austin.
Roy, et al., "Garbage Collection in Object-Oriented Databases Using Transactional Cyclic Reference Counting", VLDB Journal—The International Journal on Very Large Da Bases, vol. 7, Issue 3, 1998, 179-193.
Seligmann, et al., "Incremental Mature Garbage Collection, In the European Conference on Object-Oriented Programming", M.Sc. Thesis @ http://www.daimi.aau.dk/jacobse/Papers/, 1995.
Shuf, et al., "Exploiting Profilic Types for Memory Management and Optimizations. ACM ISBN Sep. 2, 2001", POPL, Jan. 2002, Portland.
Sobalvarro, "A Lifetime-based Garbage Collector for LISP Systems on General-Purpose Computers", Department of Electrical Engineering and Computer Science at MIT, Sep. 1988, AITR-1417.
Stamos, "Static Grouping of Small Objects to Enhance Performance of a Paged Virtual Memory", ACM Transactions on Computer Systems, vol. 2, No. 2, May 1984, 155-180.
Ungar, "Generation Scavenging: A Non-Disruptive High Performance Storage Reclaration Algorithm", ACM SIGPLAN Notices, Apr. 1984, 19(5).
Ungar, et al., "Tenuring Policies for Generation-Based Storage Reclamation", ACM SIGPLAN Notices, 1988, 23(11)1-17.
Wilson, "Uniprocessor Garbage Collection Techniques", Proceedings of Int'l Workshop on Memory Management, 1992, V. 637.
Wilson, "Uniprocessor Garbage Collection Techniques", Technical Report, University of Texas, 1994.
Withington, P.T., "How Real is "Real-Time" GC?", Symbolics, Inc., Oct. 6, 1991, Burlington, MA.
Zee, et al., "Write Barrier Removal by Static Analysis", OOPSLA '02, Nov. 2002.
Zorn, "Segregating Heap Objects by Reference Behavior and Lifetime", in 8th Int'l Conferenceon Architectural Support for Programming Languages and Operating Systems, Oct. 1998, 12-32, San Jose, CA.
Zorn, Benjamin, "Barrier Methods for Garbage Collection", Dept. of Computer Science, Uni. Of Colorado, Nov. 1990, 1-37, Boulder.
Azagury, et al., "Combining Card Marking With Remembered Sets: How to Save Scanning Time", ACM SIGPLAN Notices, Oct. 1998, V. 34(3), ACM Press, Vancouver, Canada.
Cheney, "A Nonrecursive List Compacting Algorithm, vol. 13, No. 11", Communications of the ACM, Nov. 1970, 677-678, Uni. Math. Lab., Cambridge, European Patent Office.
Cheng, et al., "Generational Stack Collection and Profile-Driven Pretenuring", SIGPLAN'98 Conference on Programming Languages Design and Implementation, Jun. 1998, 162-173, ACM PRESS, Montreal, Canada.
Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.
Lam, et al., "Object Type Directed Garbage Collection to Improve Locality", Proceedings of the International Workshop on Memory Management, Sep. 1992, 404-425, St. Malo, France.
Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.
Wilson, et al., "Effective Static-Graph Reorganization to Improve Locality in Garbage Collected Systems", Proceedings of ACM SIGPLAN Conference on Programming Language Design and Implementation, Jun. 1991, Canada.
Hudson, et al., "Sapphire: Copying CG Without Stopping the World", Practice and Experience Special Issue, Jun. 2001, JAVA/Grande/Iscope, pp. 48-57.
Venners, "Garbage Collection, Inside the Java 2 Virtual Machine; Chapter 9", www.artima.com, Jan. 2000, 27 pages.
Pirinen, Pekka, "Barrier Techniques for Incremental Tracing", Harlequin Limited, 1998, Cambridge, Great Britain, pp. 20-25.

* cited by examiner

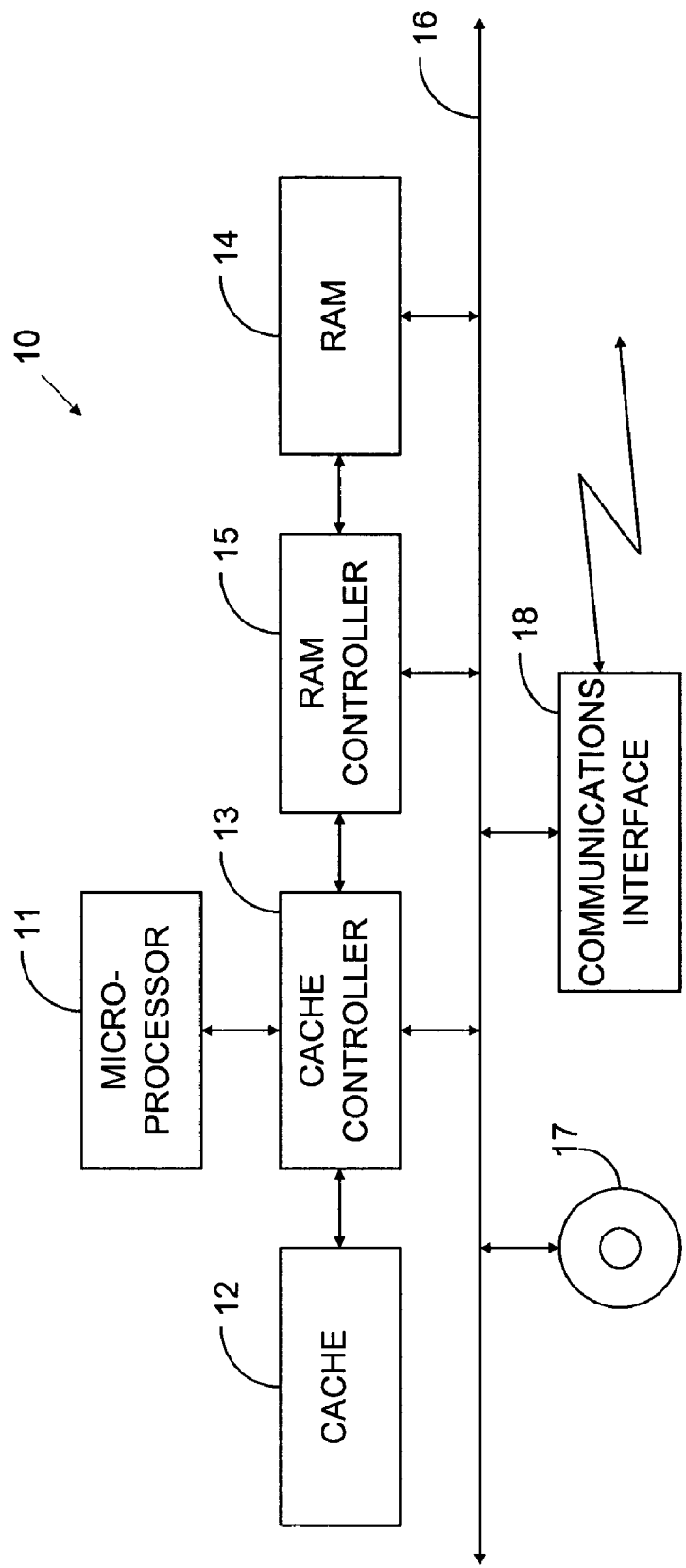
FIG. 1
(PRIOR ART)

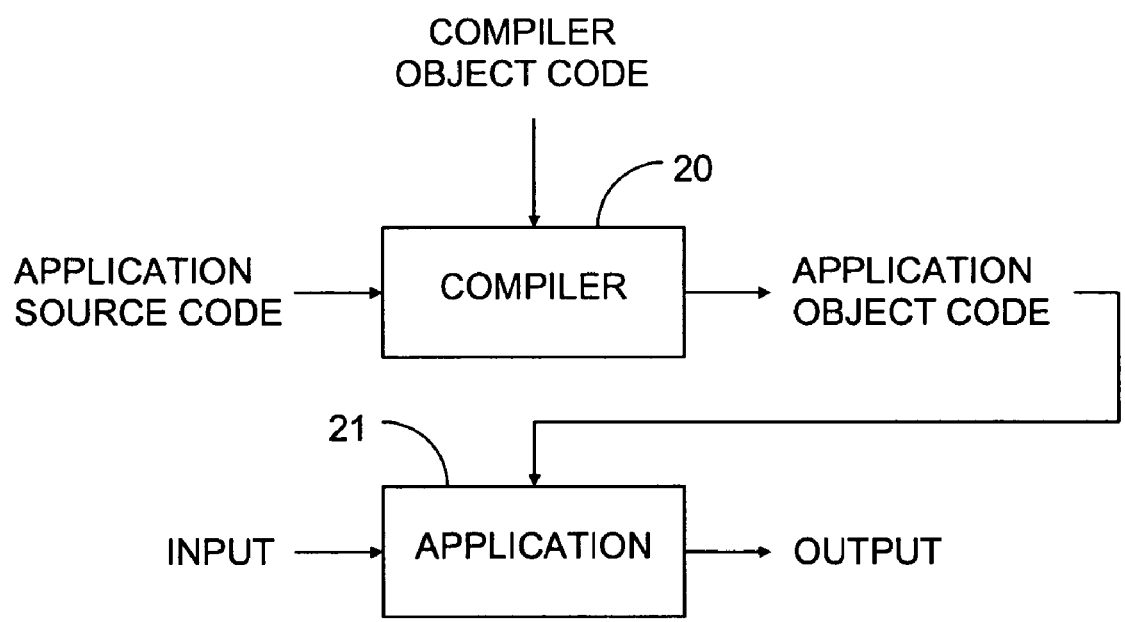
FIG. 2
(PRIOR ART)

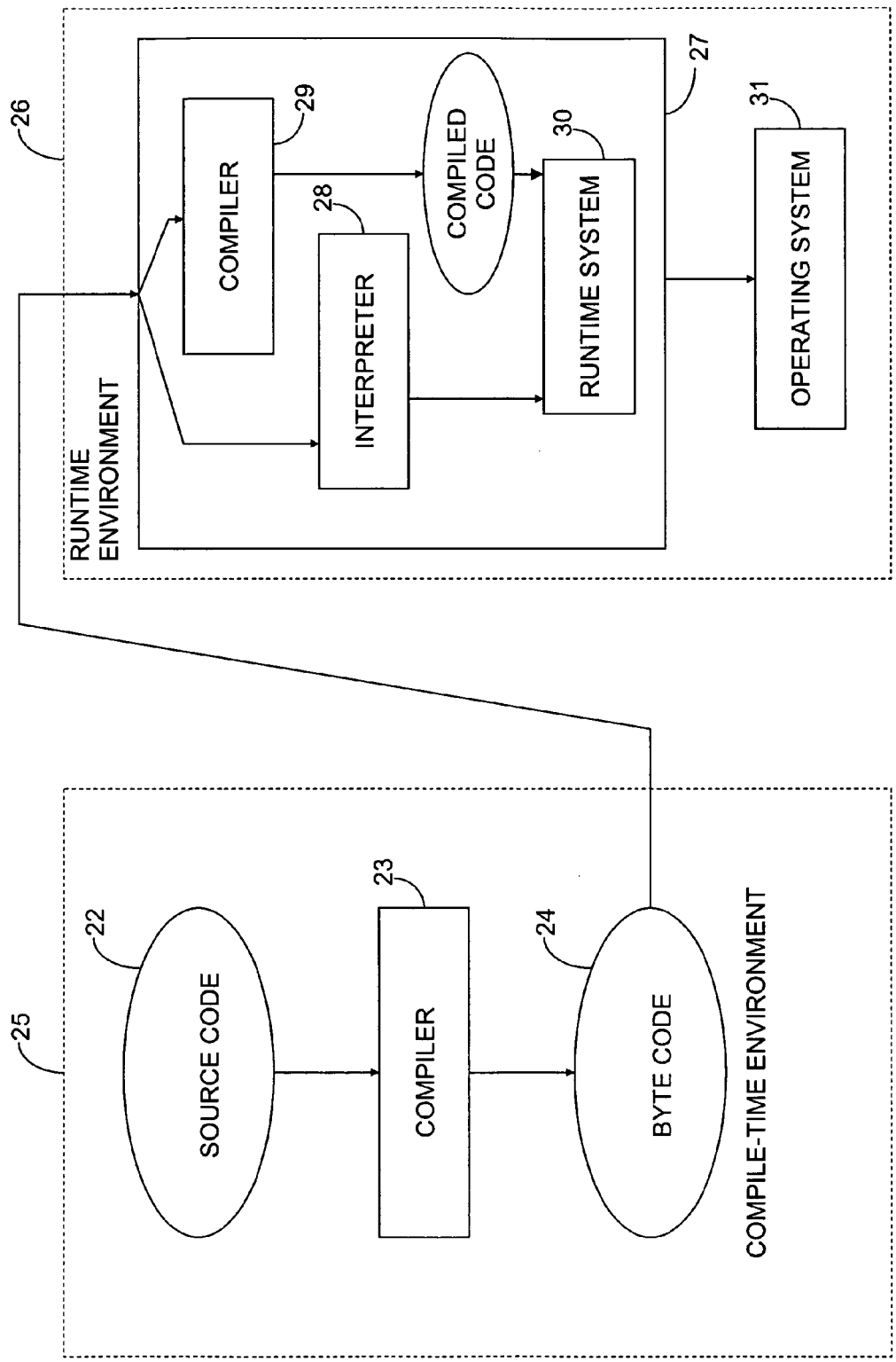
FIG. 3
(PRIOR ART)

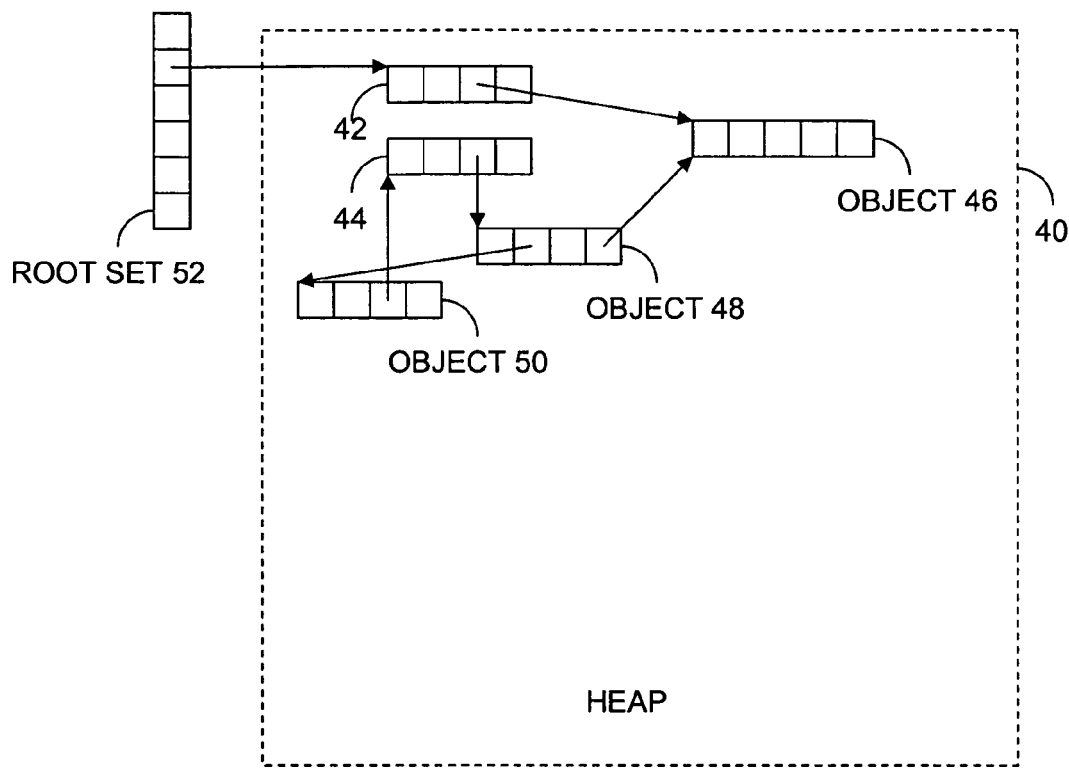
(PRIOR ART) FIG. 4
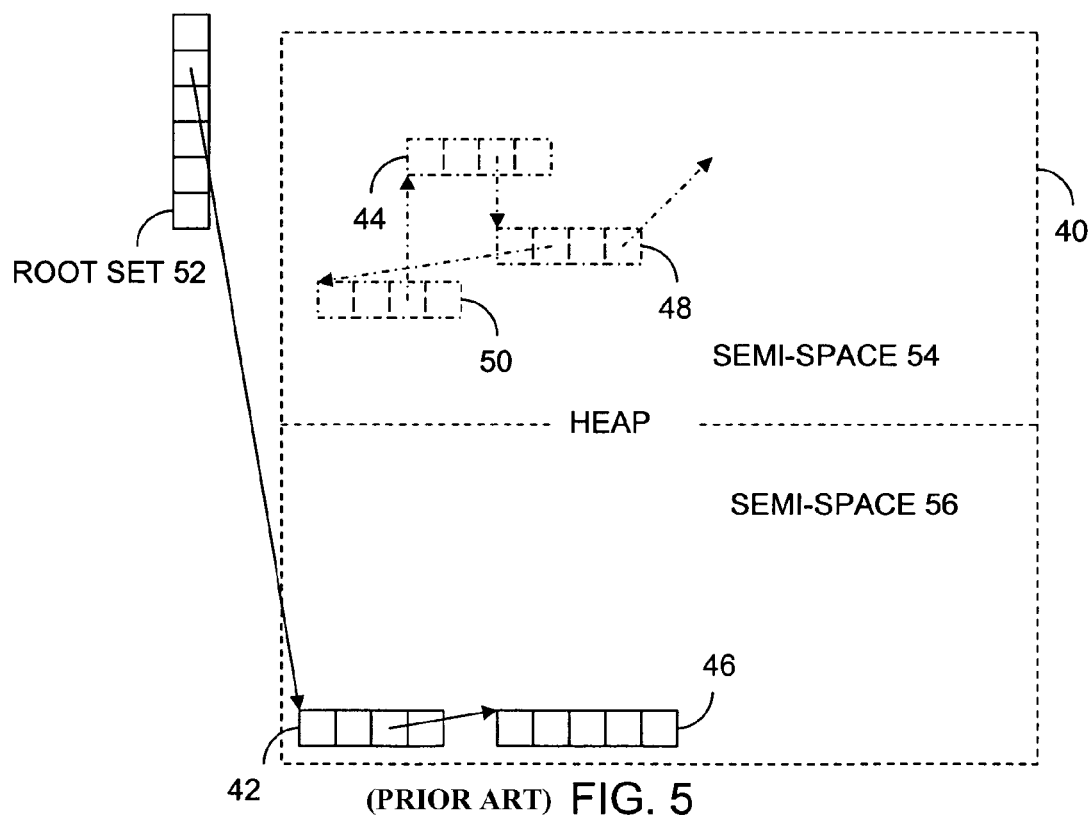
(PRIOR ART) FIG. 5

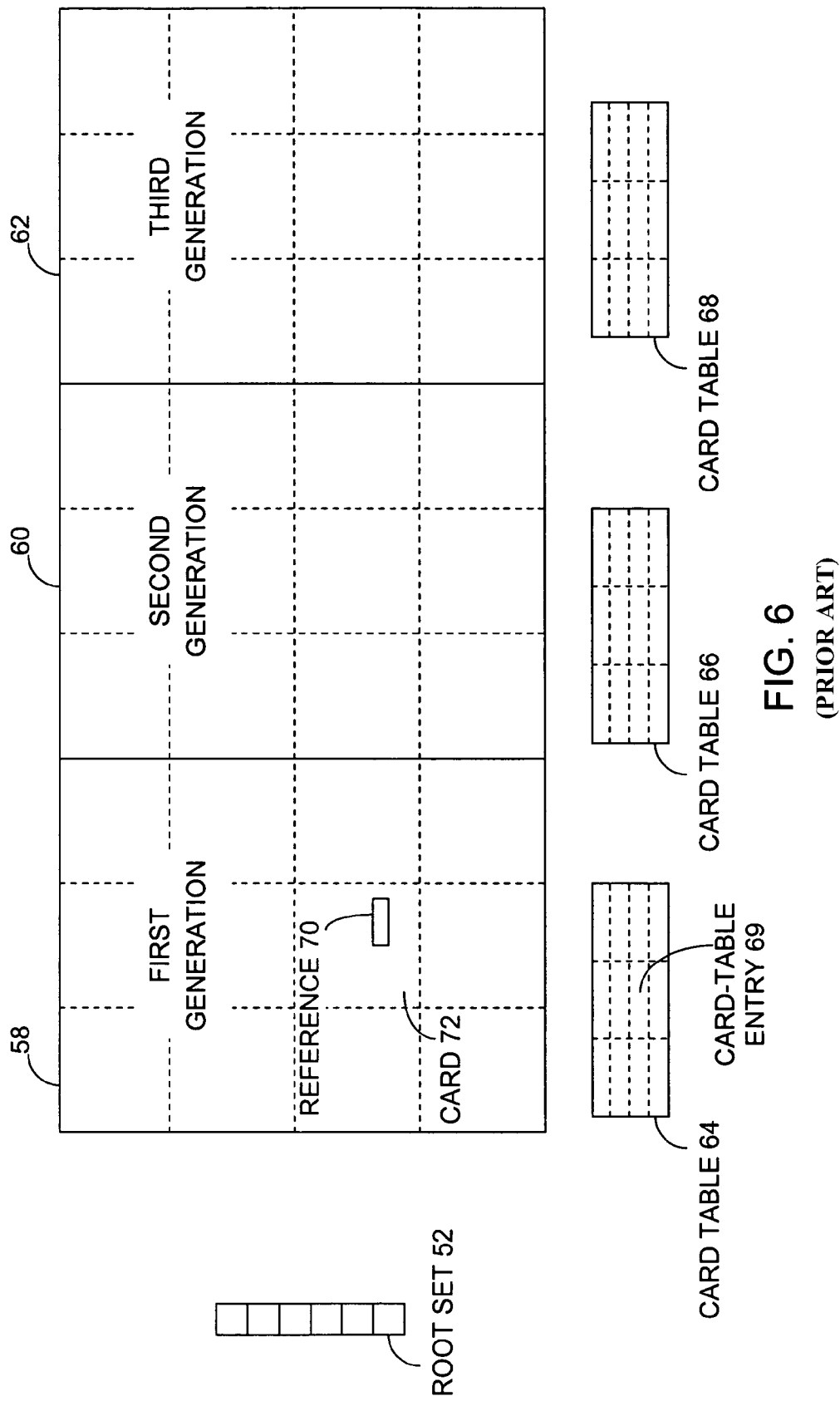
FIG. 6
(PRIOR ART)

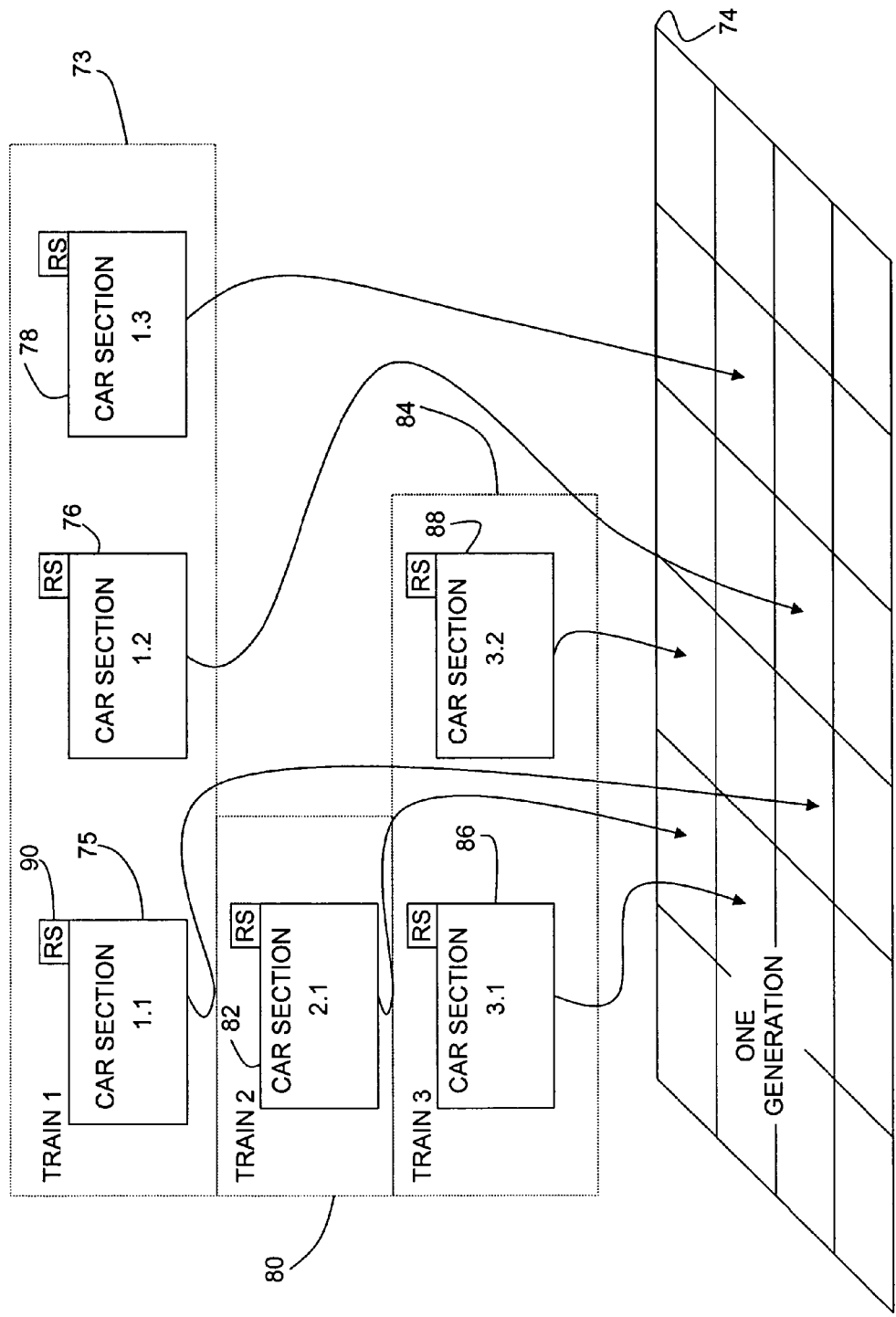
FIG. 7
(PRIOR ART)

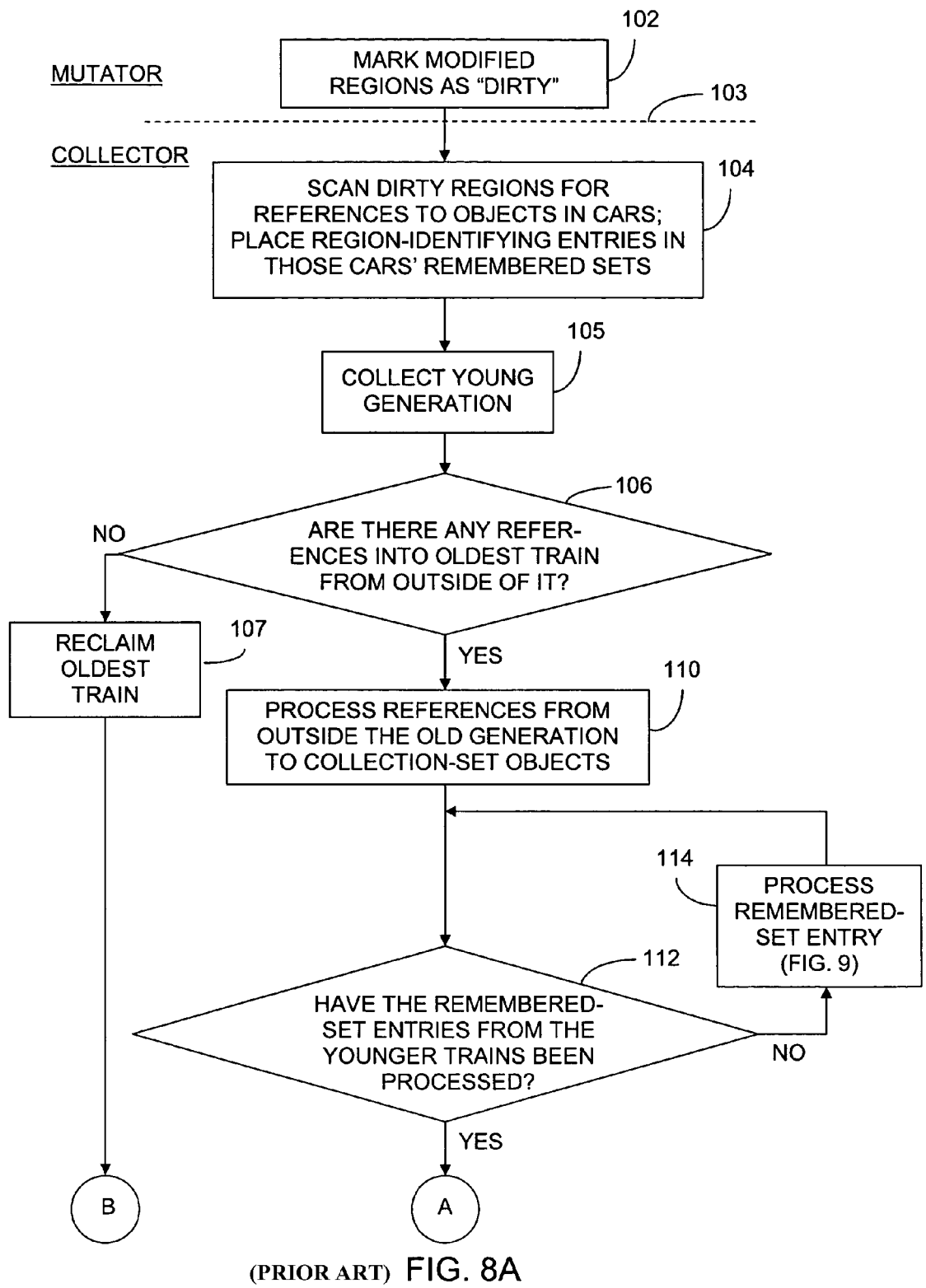
(PRIOR ART) FIG. 8A

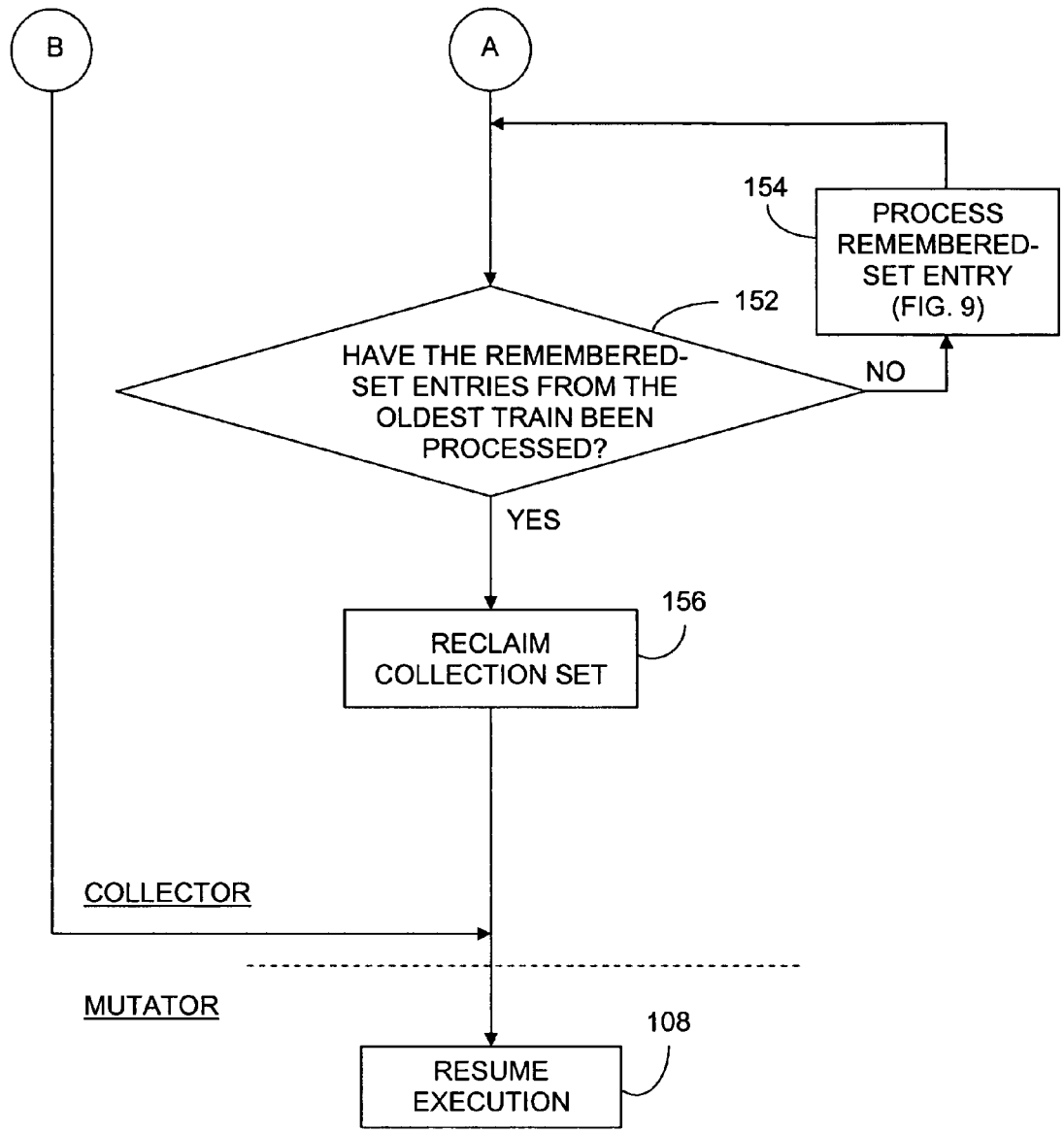
(PRIOR ART)
FIG. 8B

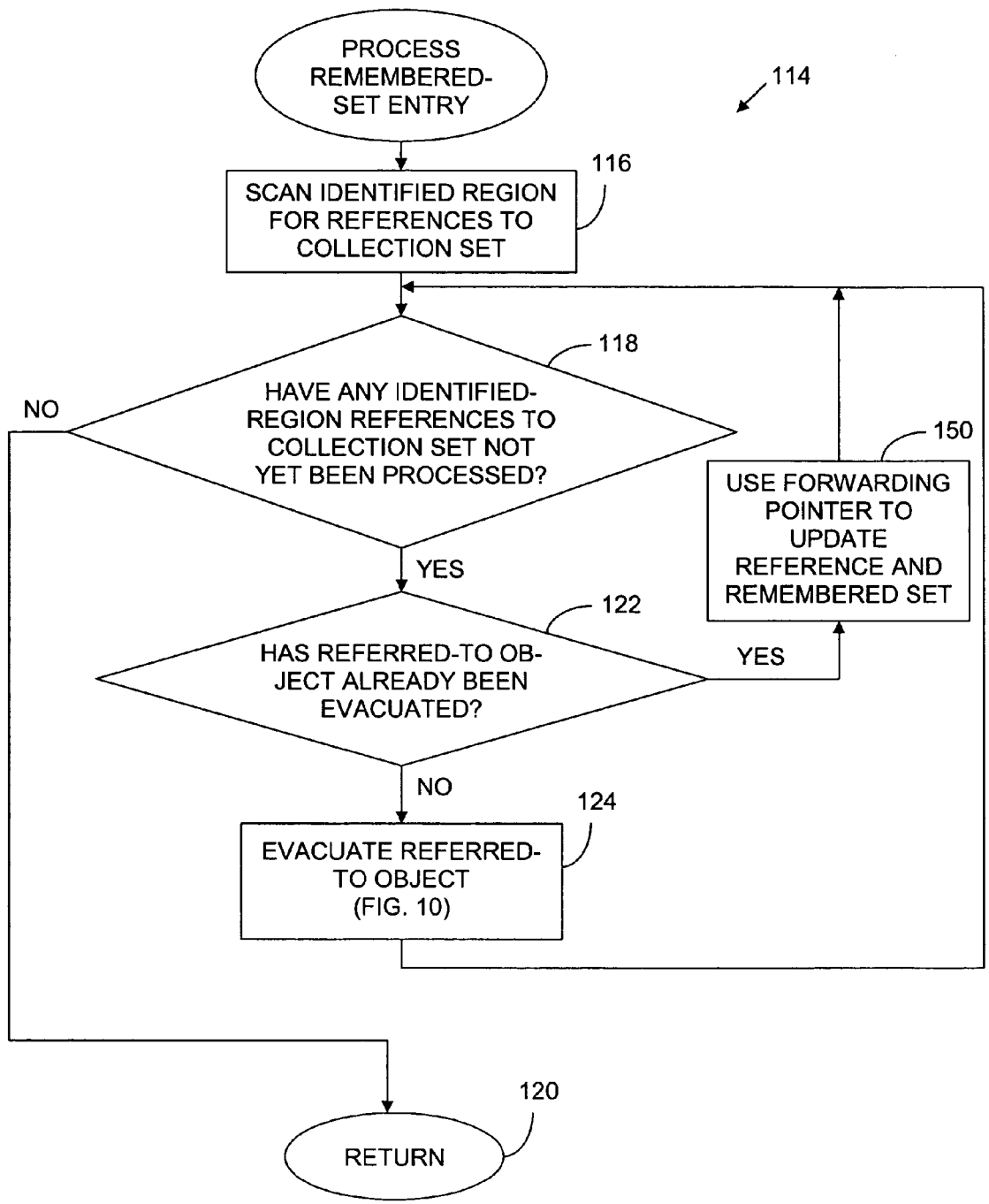
(PRIOR ART)
FIG. 9

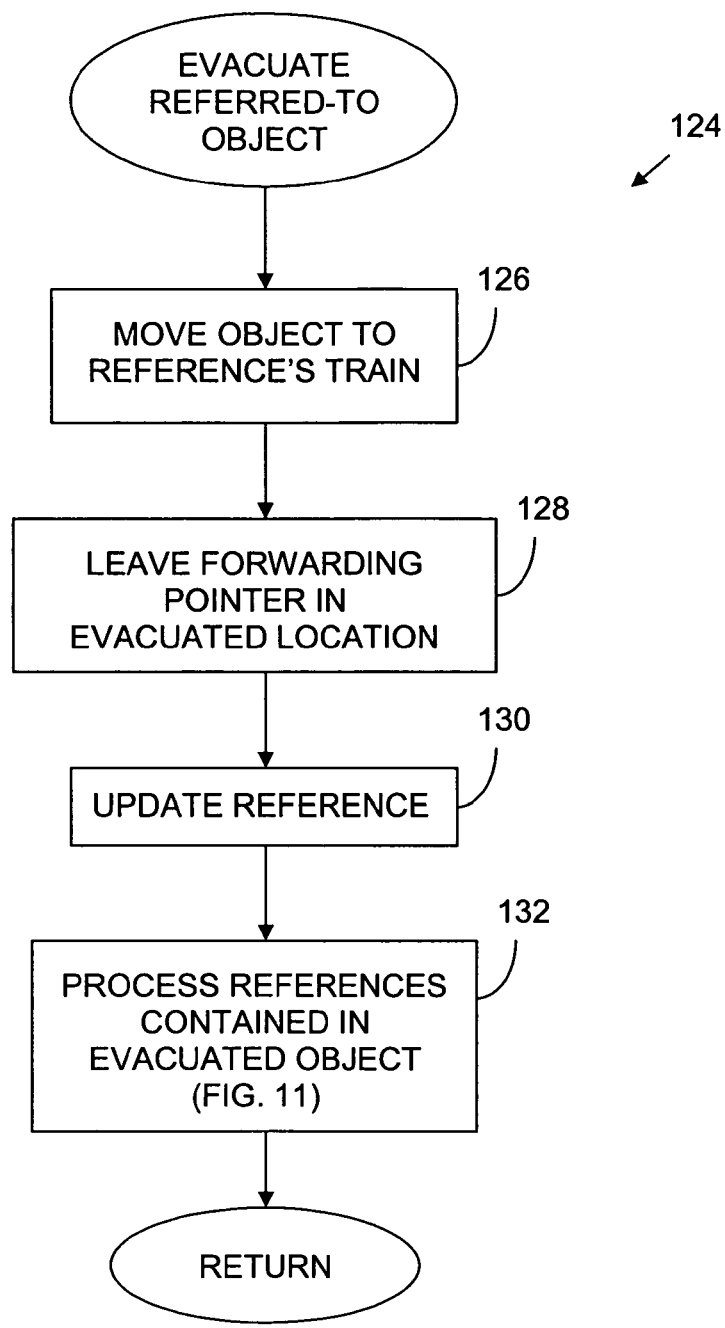
(PRIOR ART)
FIG. 10

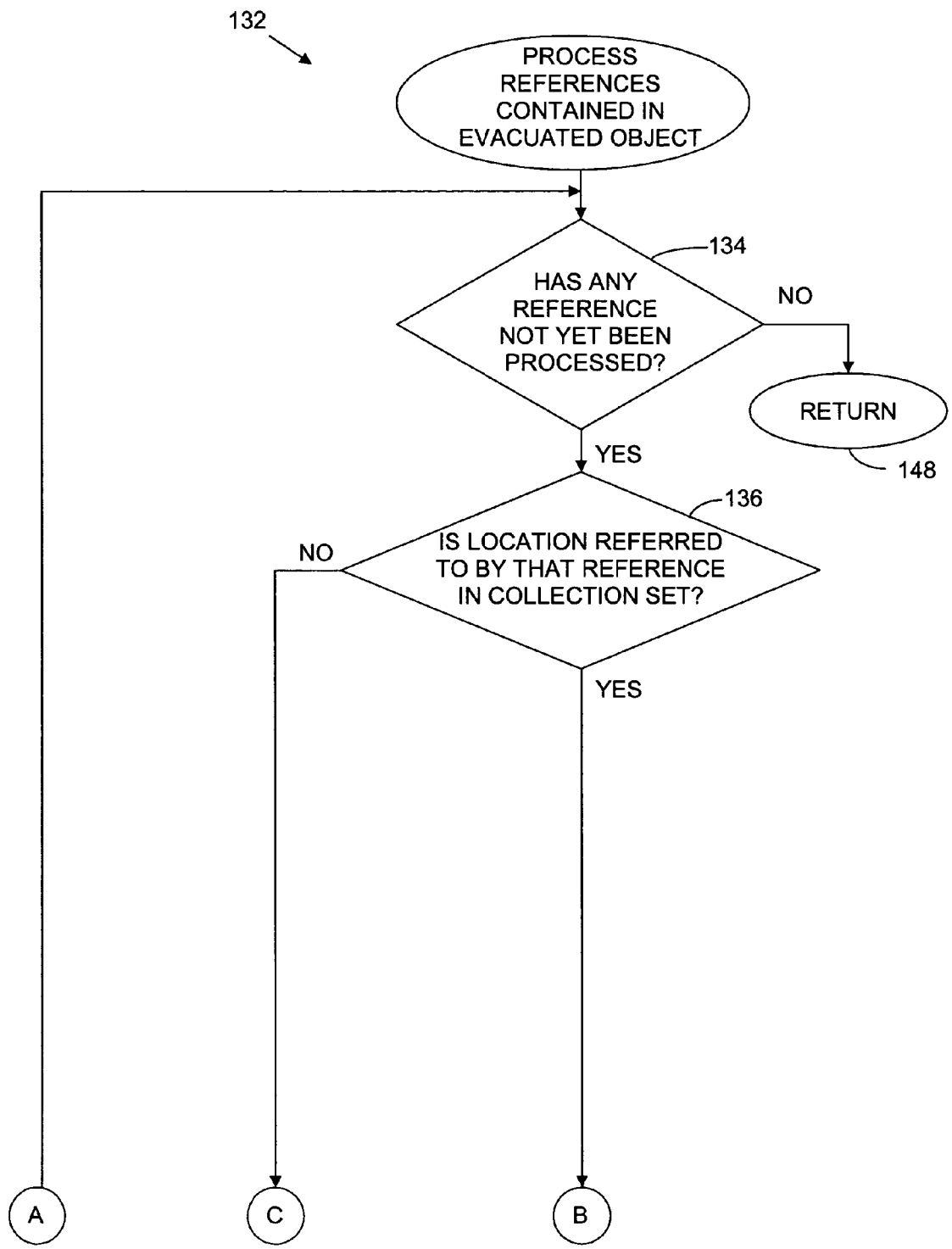
(PRIOR ART) FIG. 11A

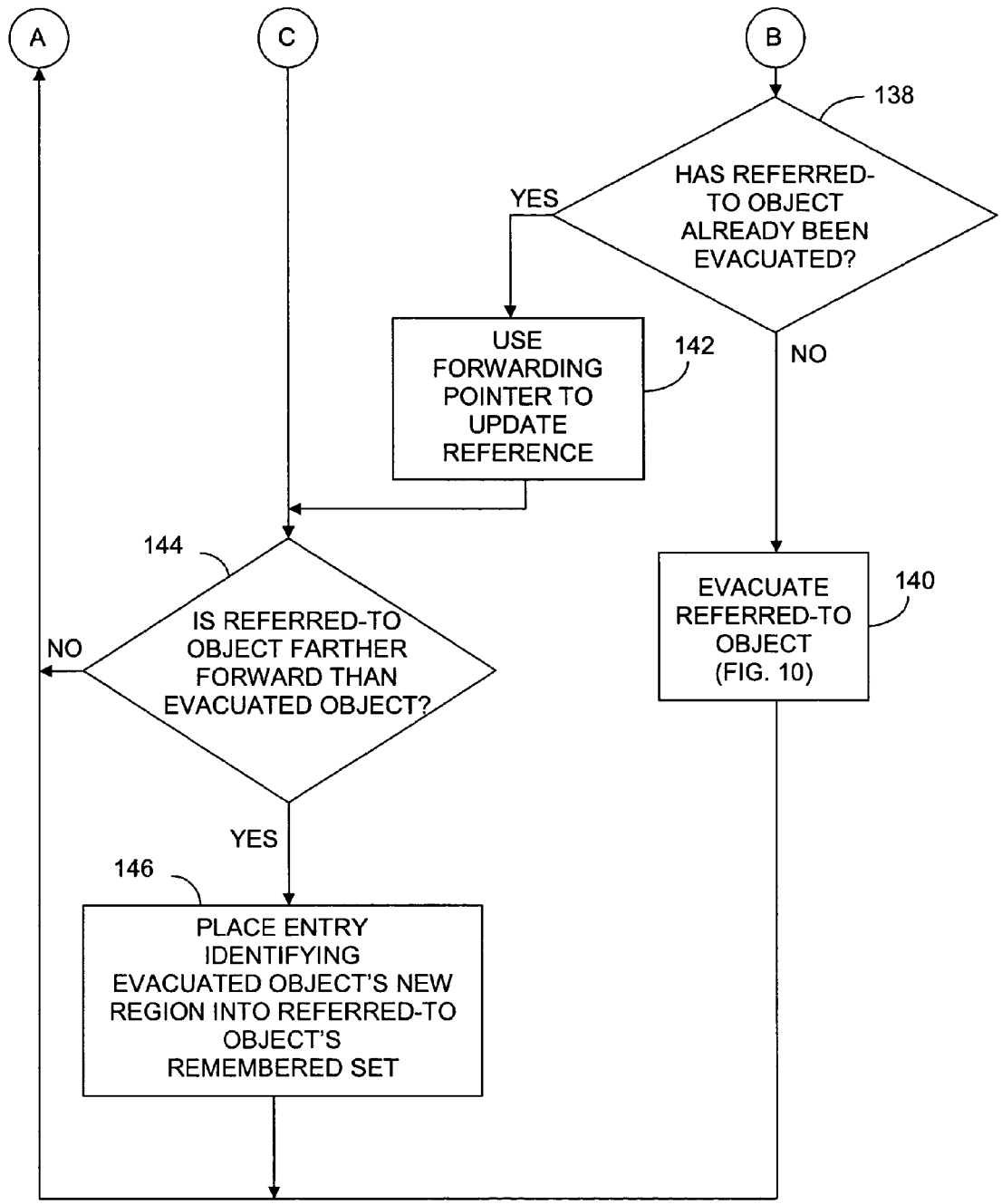
(PRIOR ART)
FIG. 11B

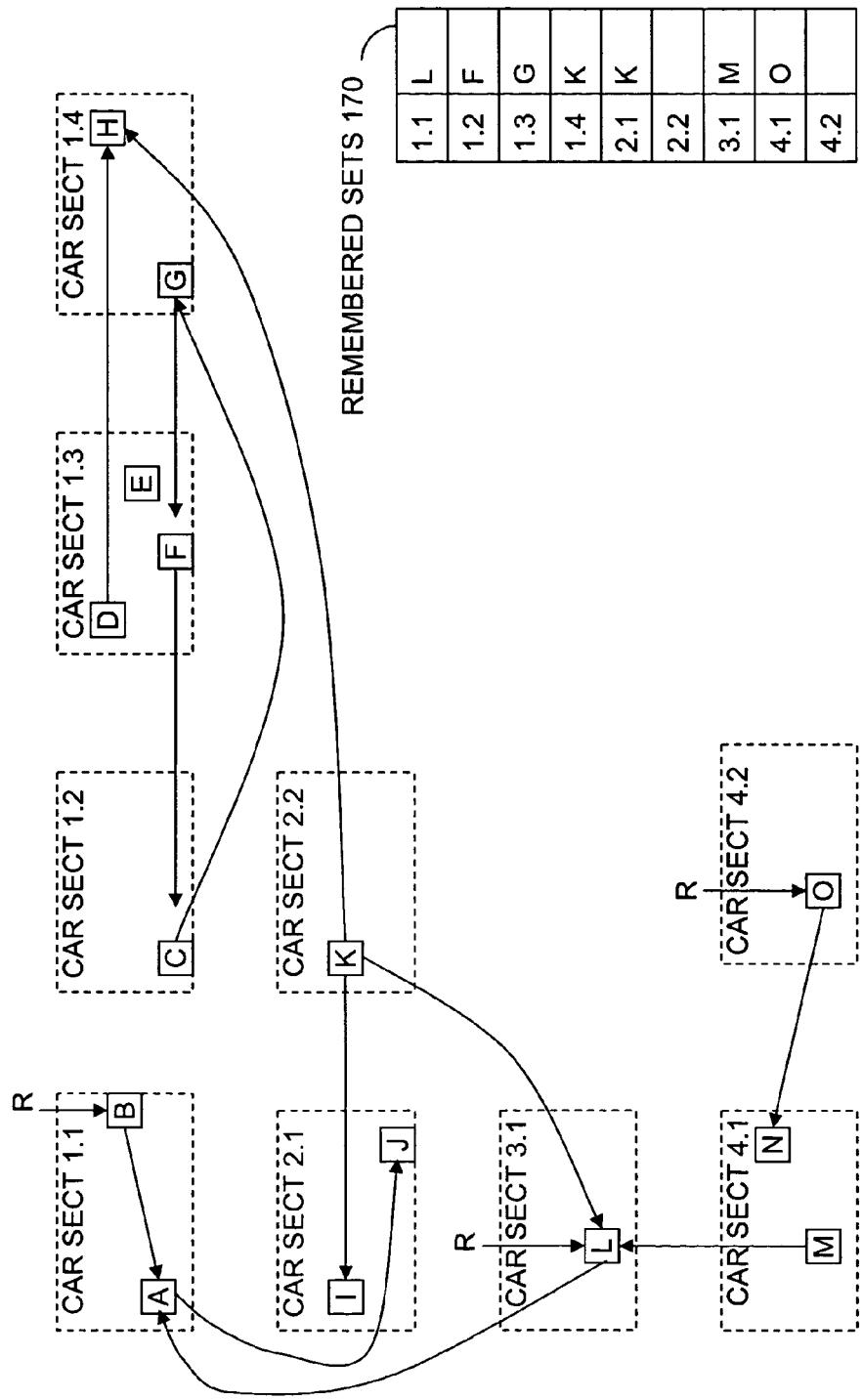
(PRIOR ART)
FIG. 12A

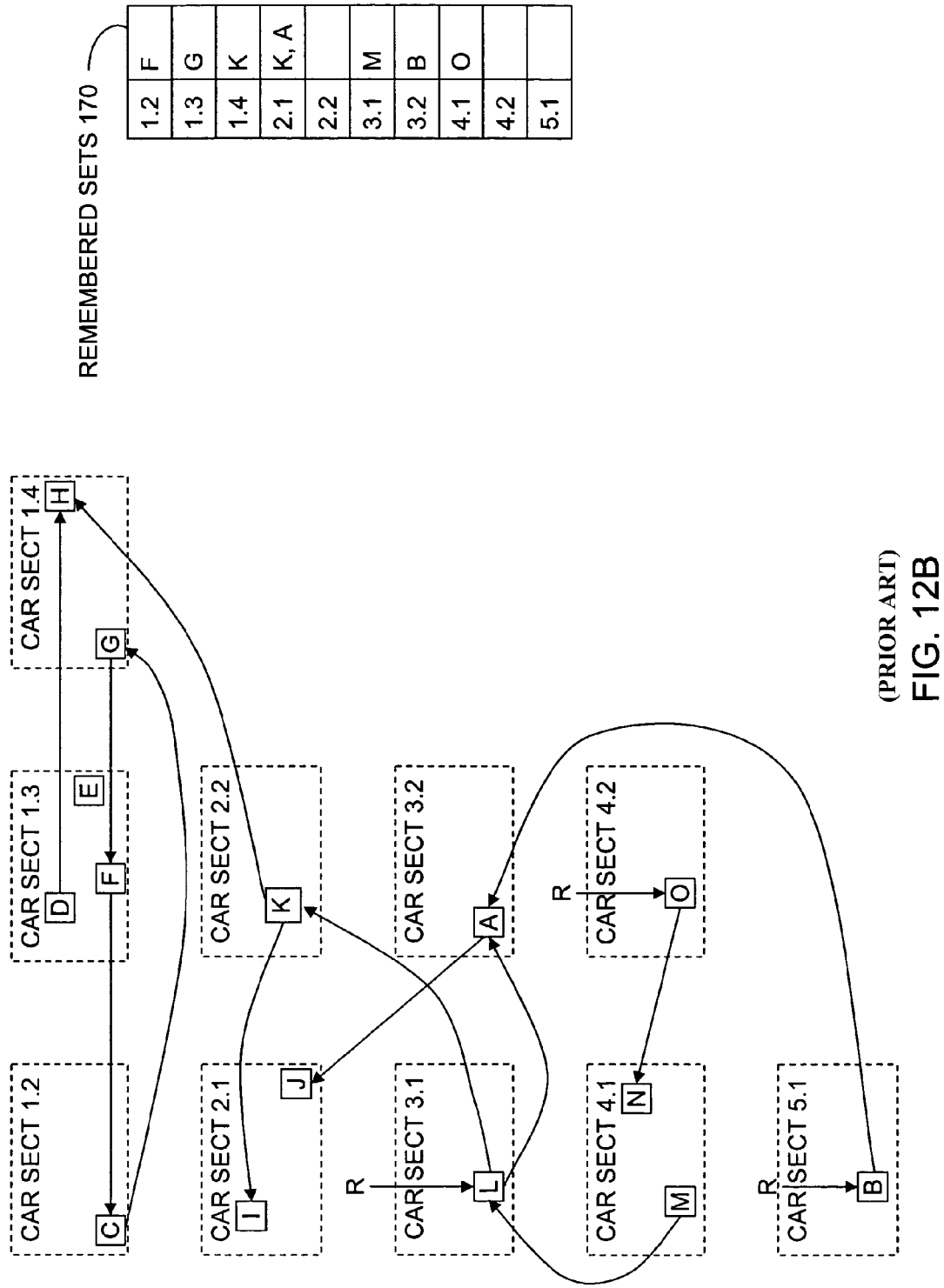
FIG. 12B (PRIOR ART)

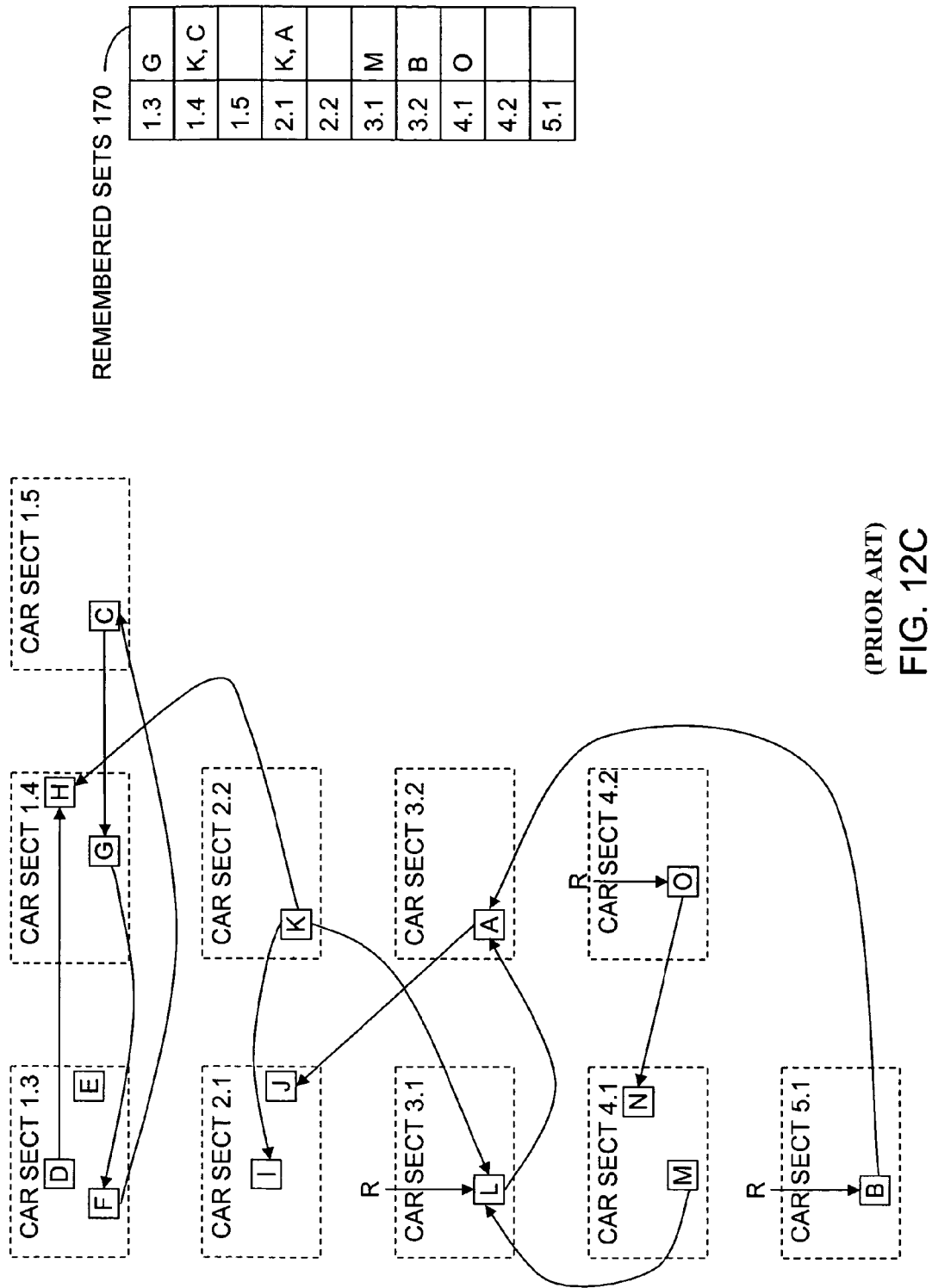
FIG. 12C
(PRIOR ART)

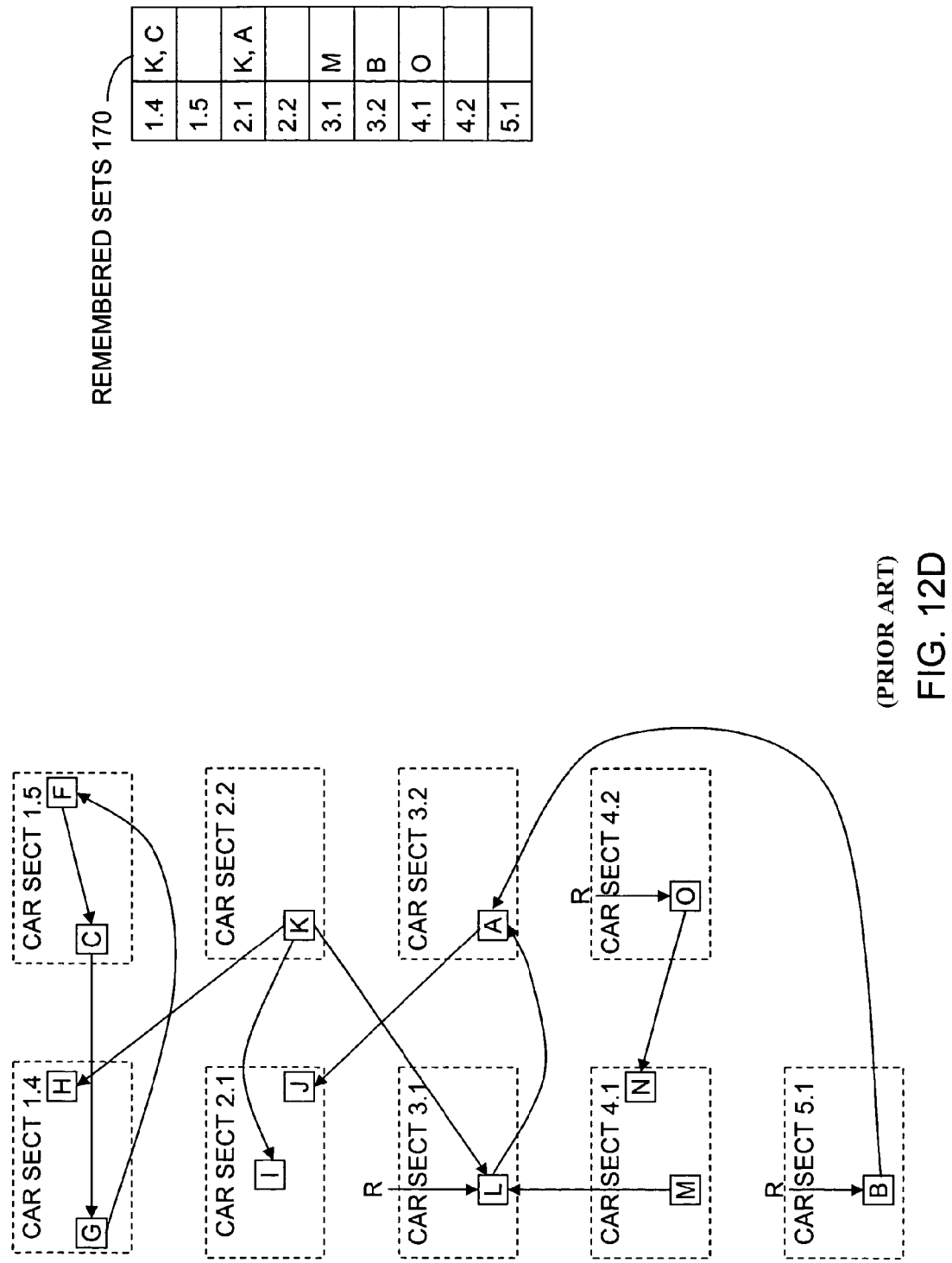
FIG. 12D
(PRIOR ART)

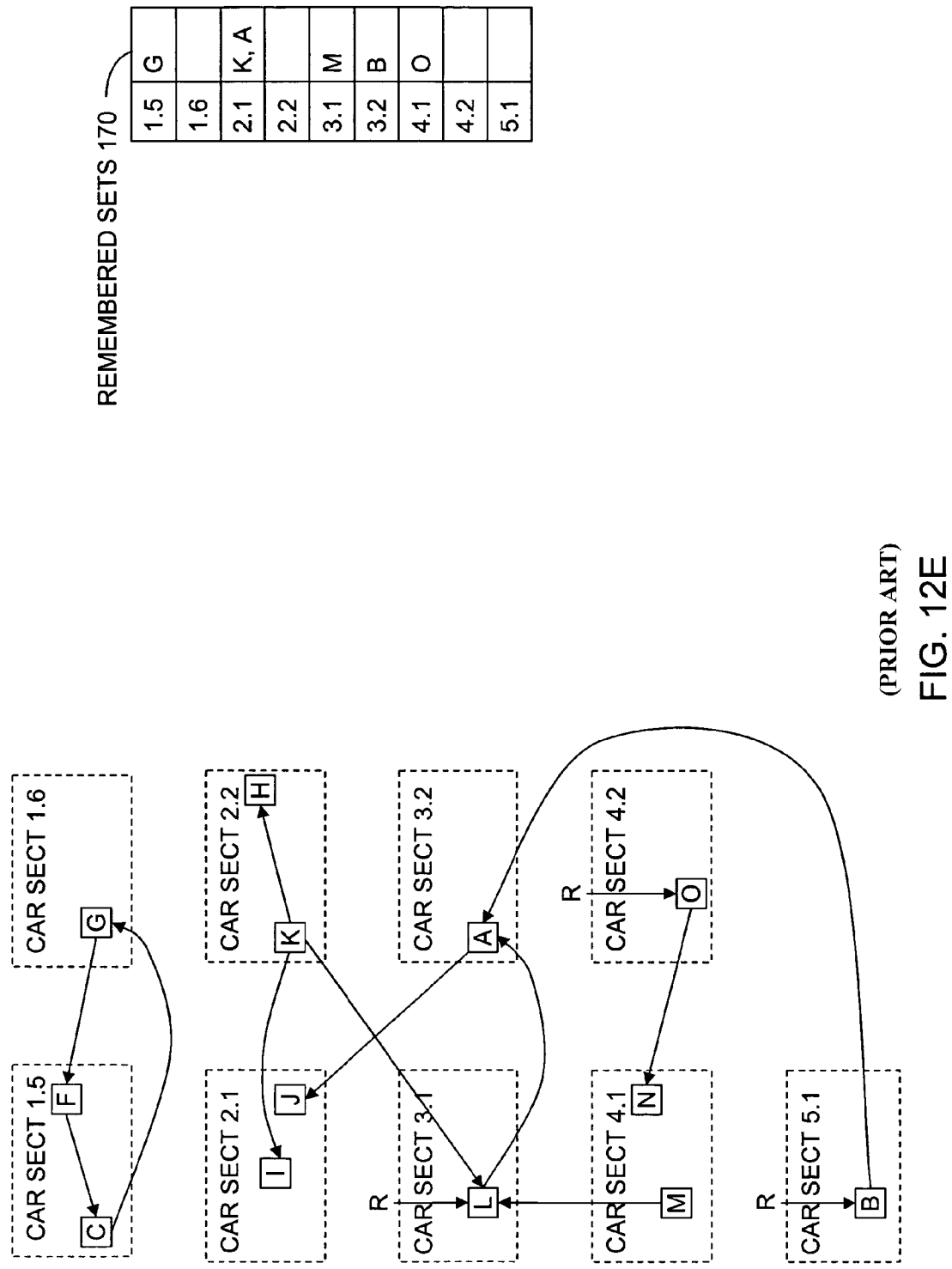
FIG. 12E
(PRIOR ART)

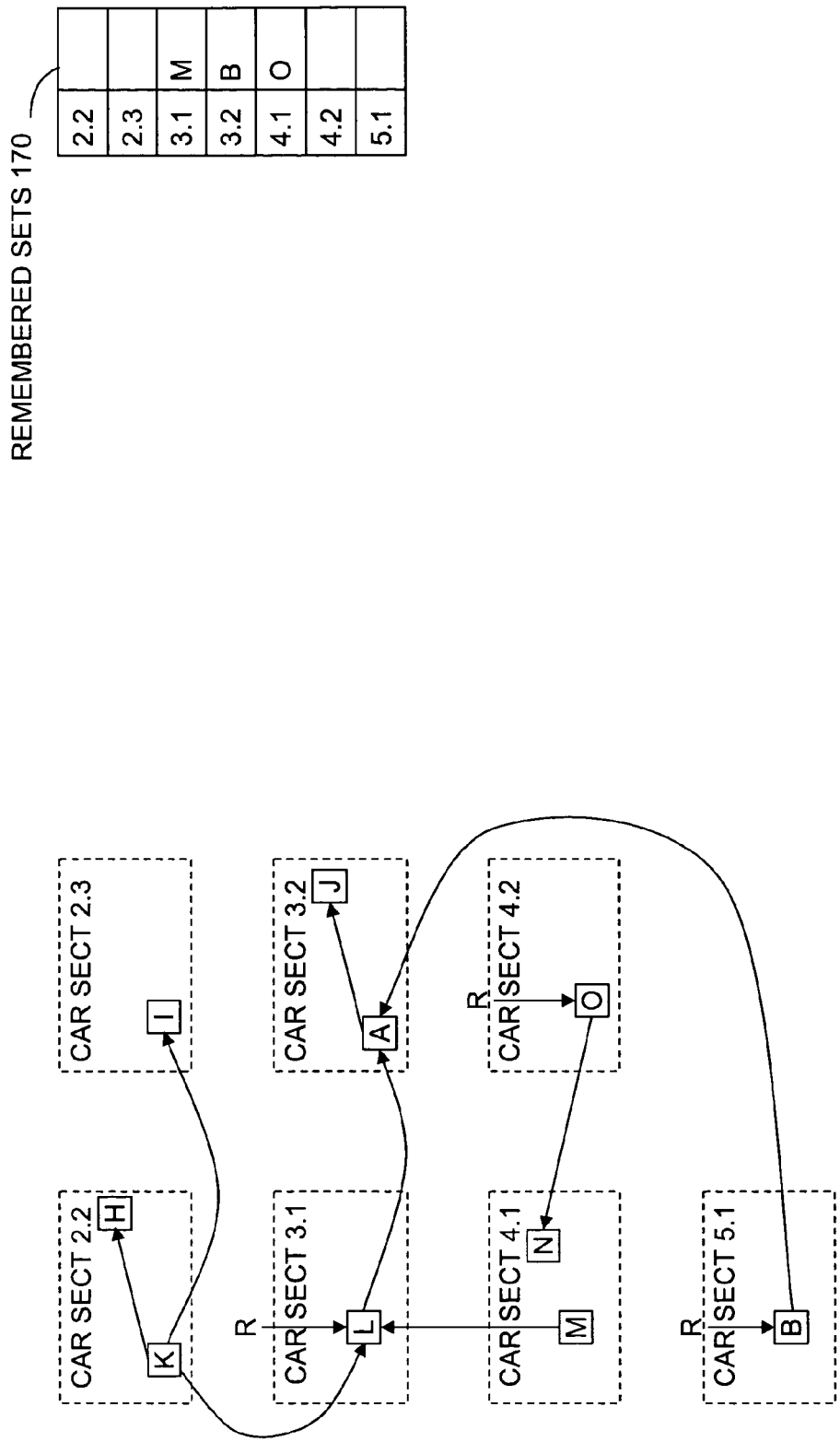
(PRIOR ART)
FIG. 12F

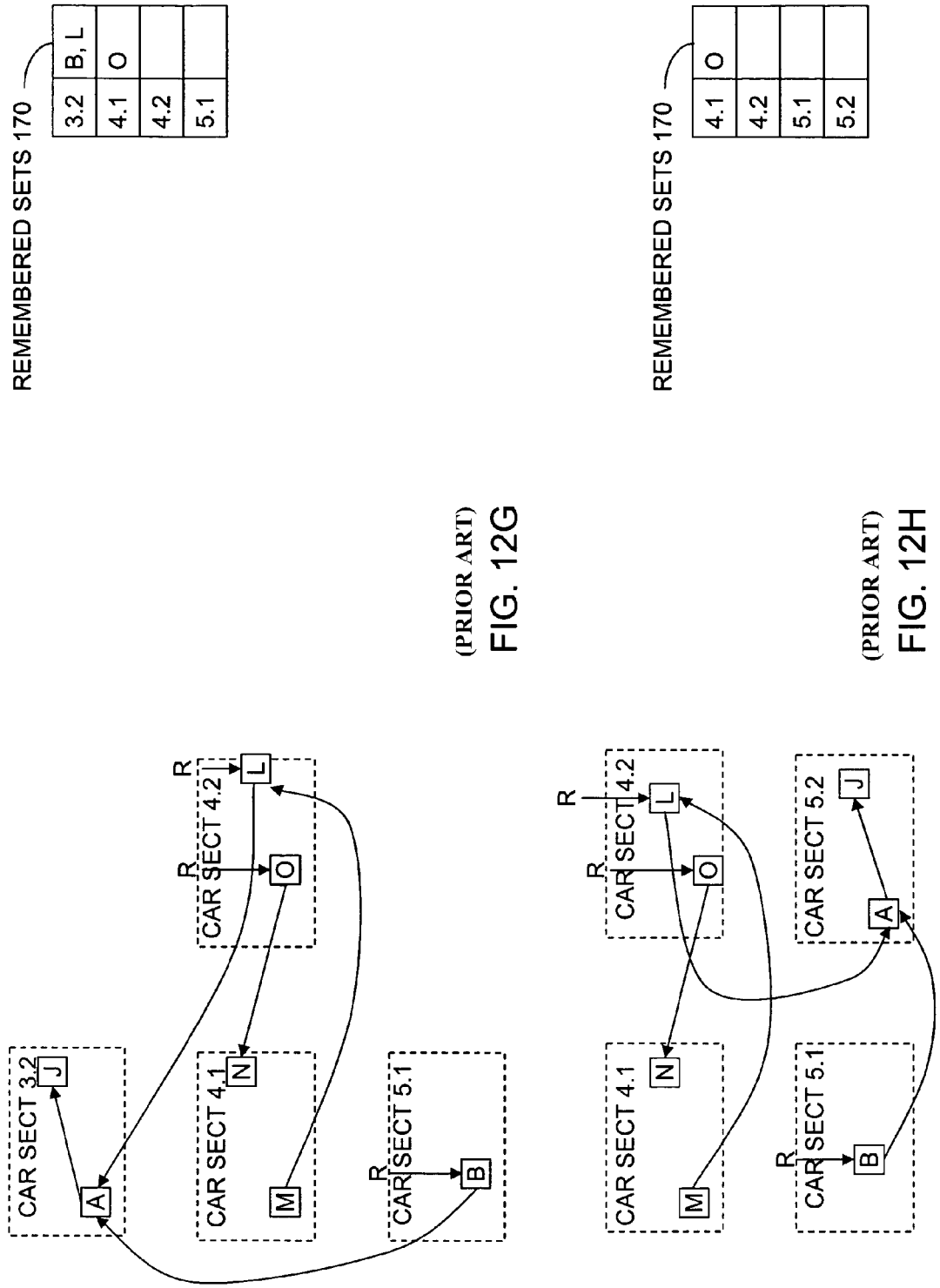
(PRIOR ART)
FIG. 12G
(PRIOR ART)
FIG. 12H

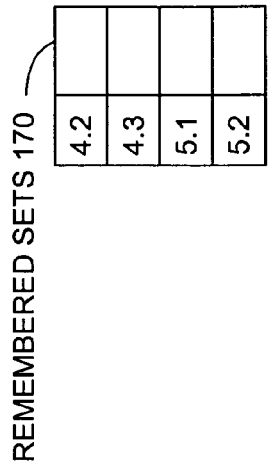
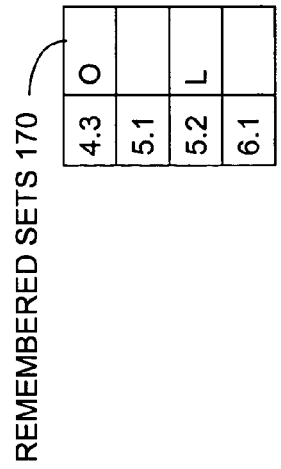
(PRIOR ART)
FIG. 12I
(PRIOR ART)
FIG. 12J
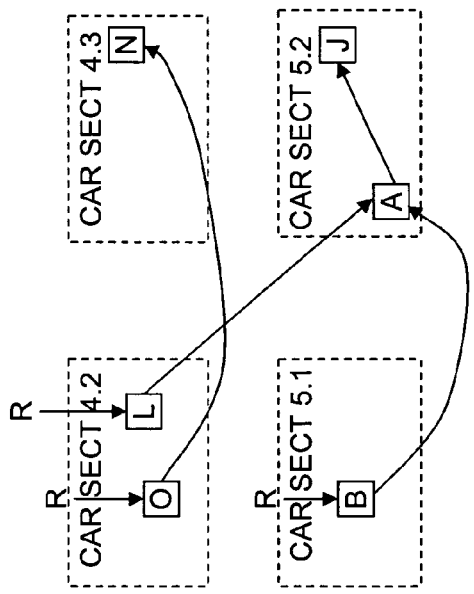
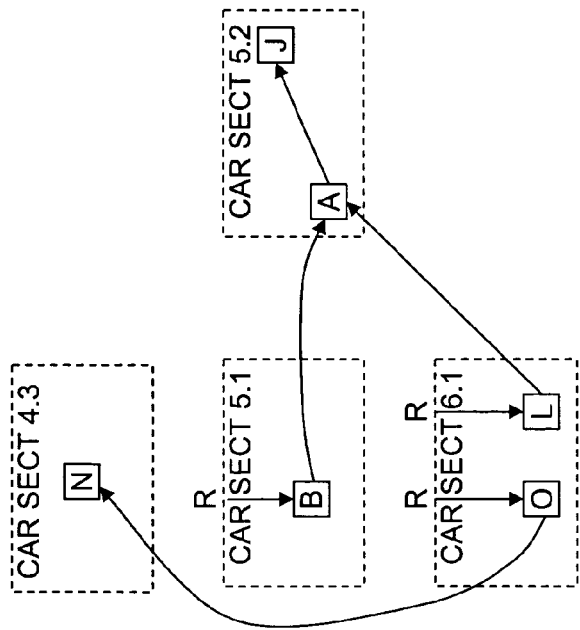

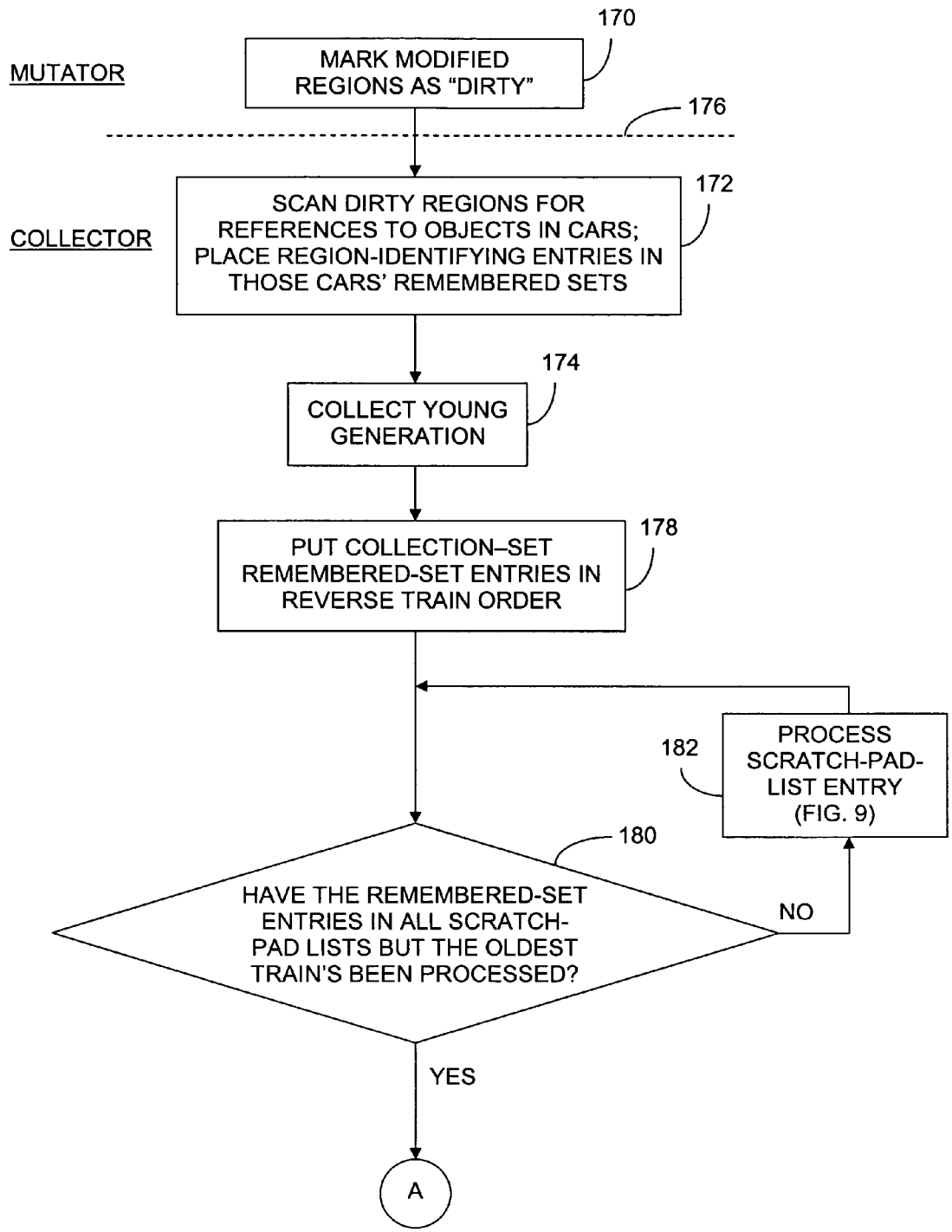
FIG. 13A

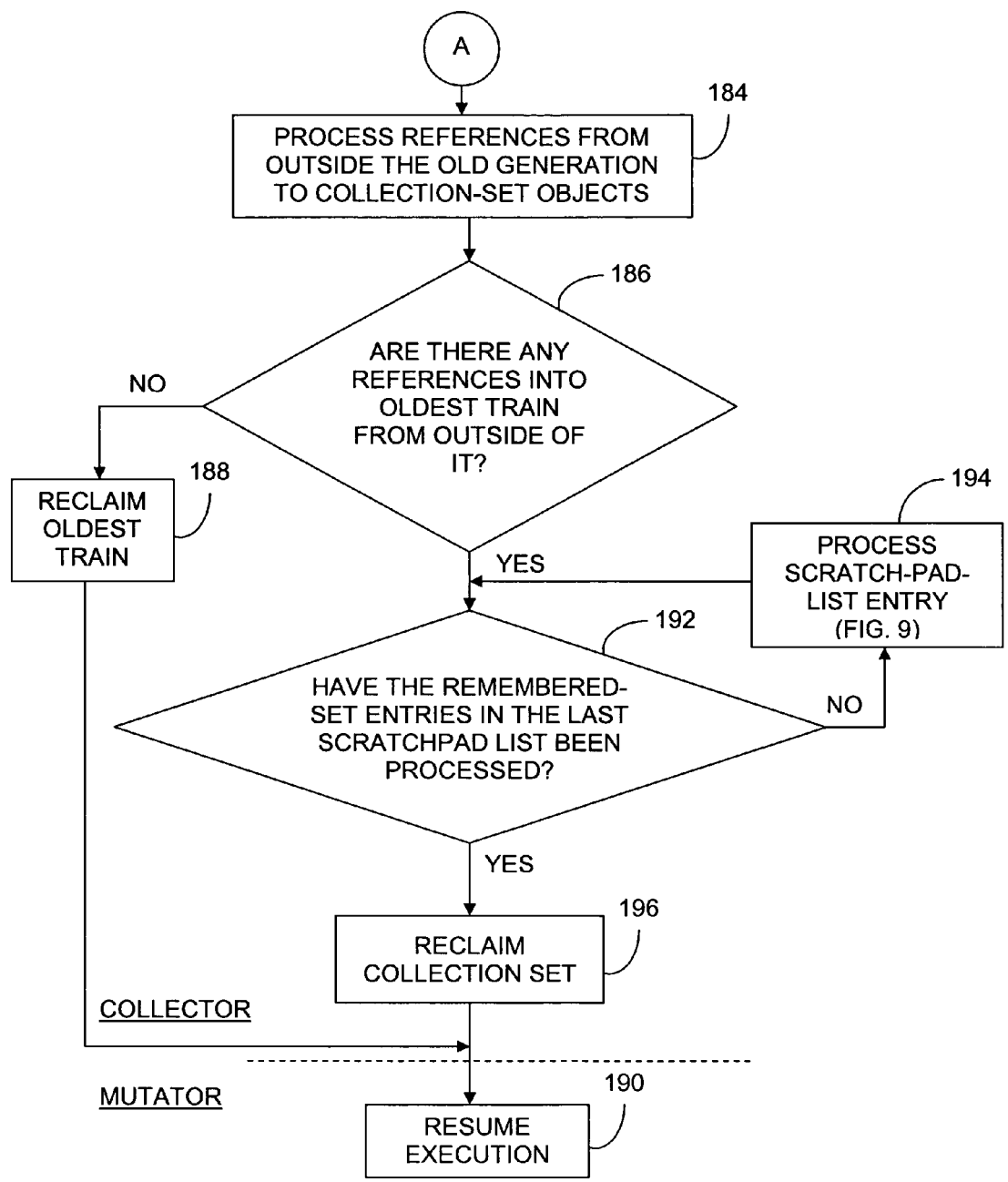
FIG. 13B

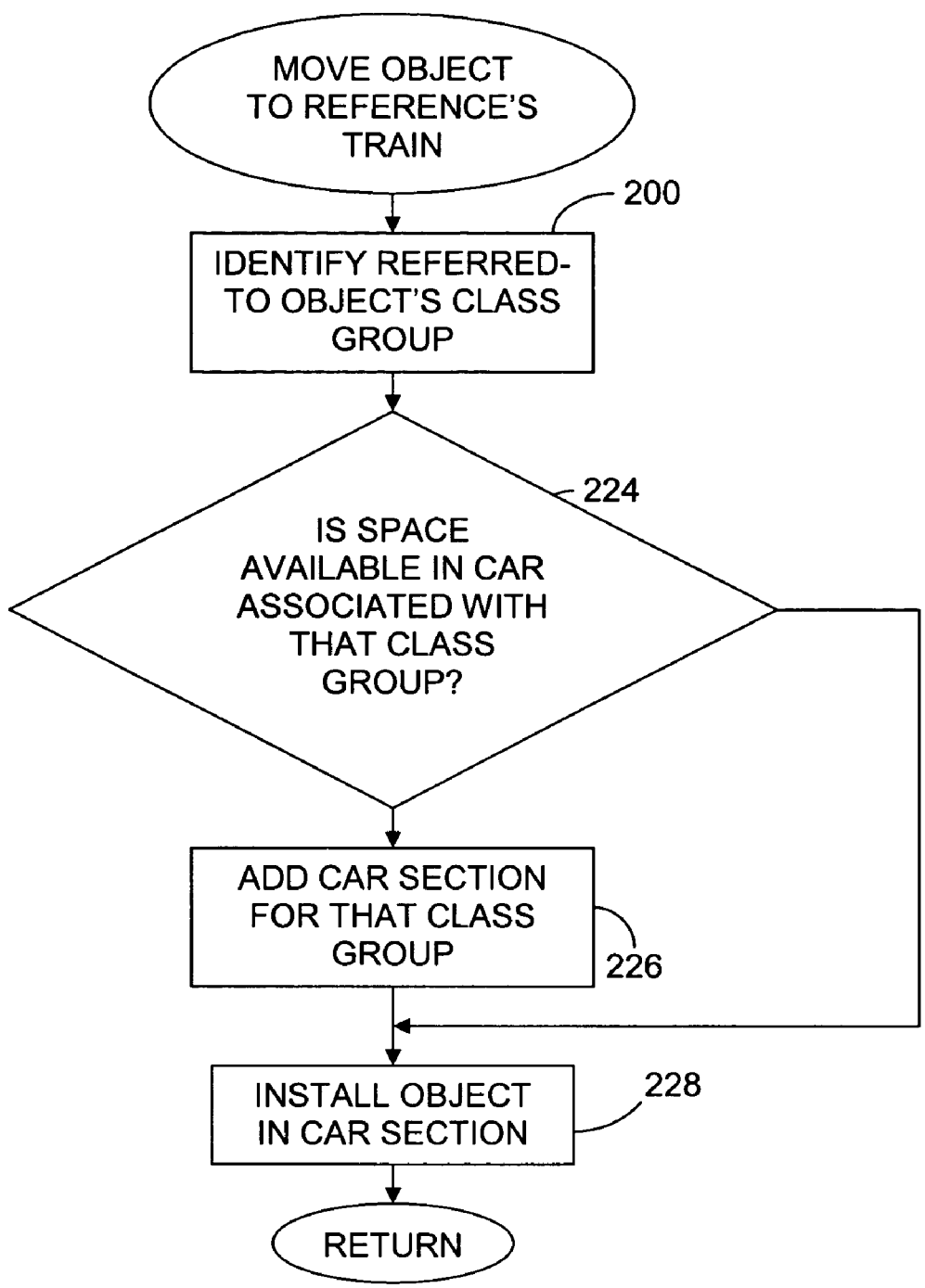
FIG. 14

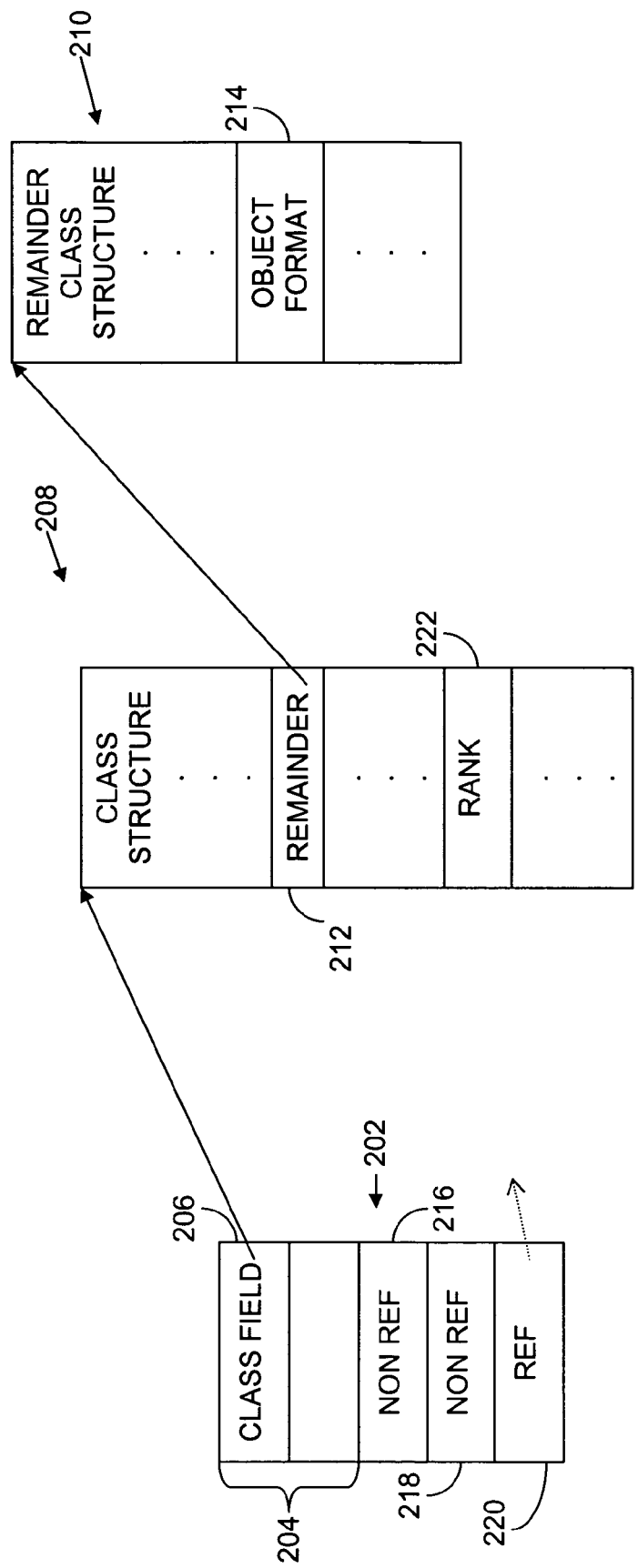
FIG. 15

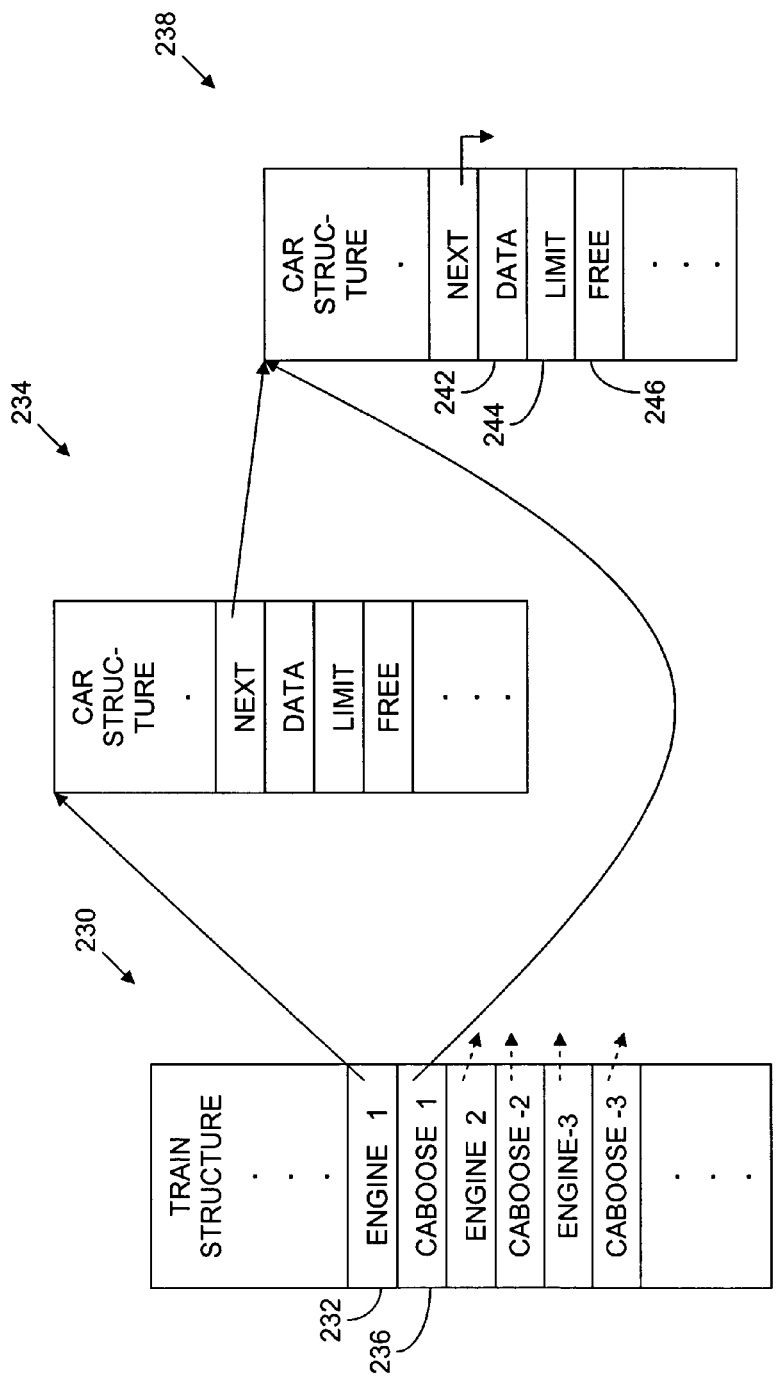
FIG. 16

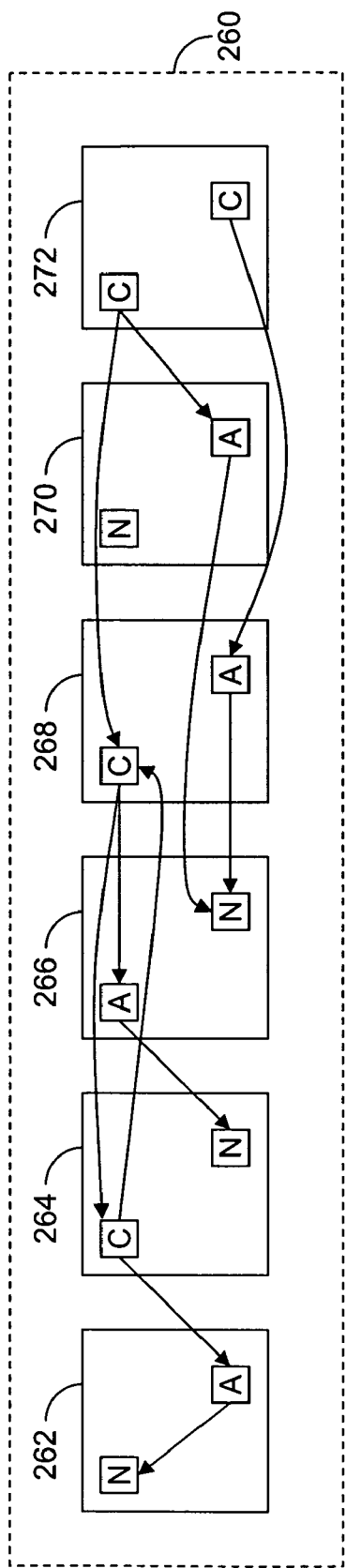
FIG. 17
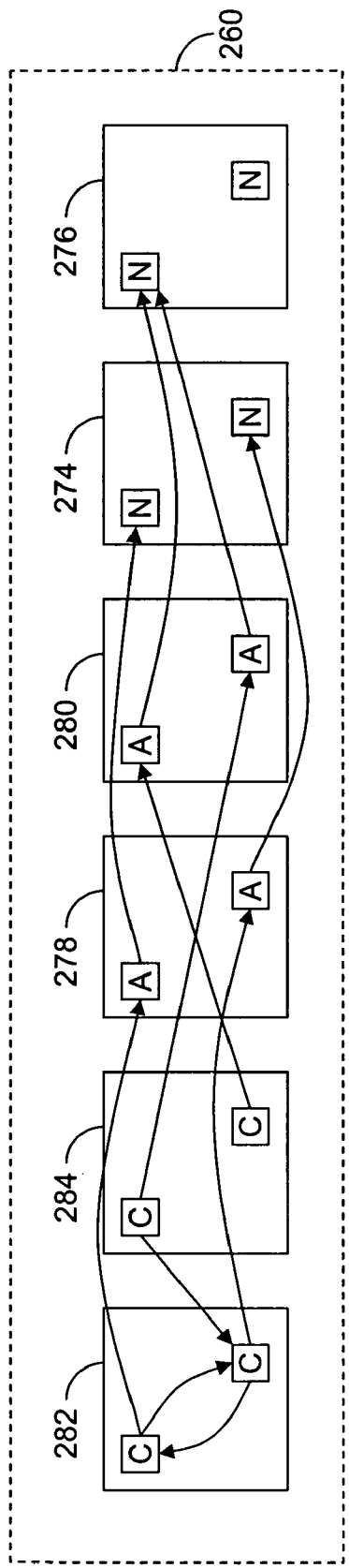
FIG. 18

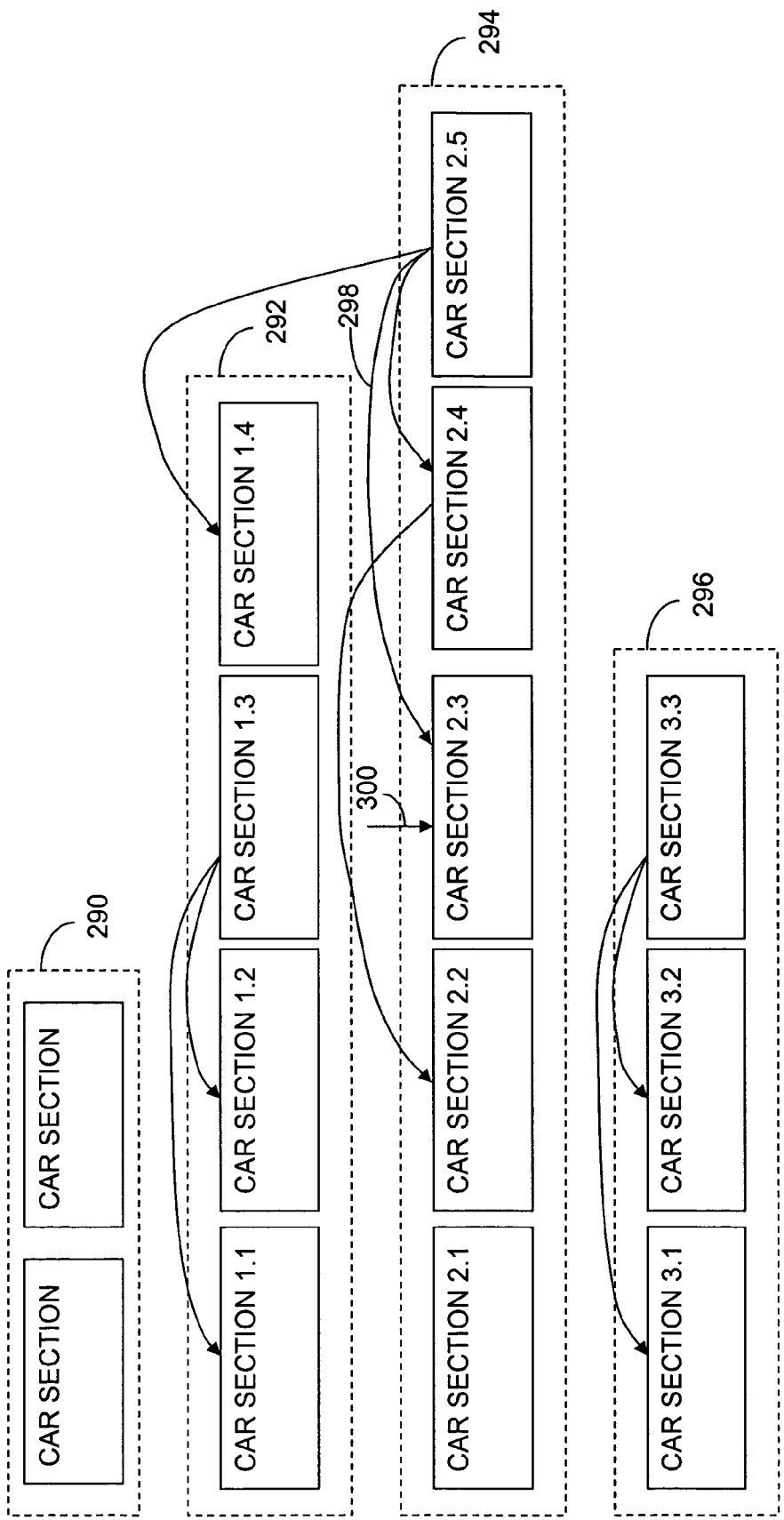
FIG. 19

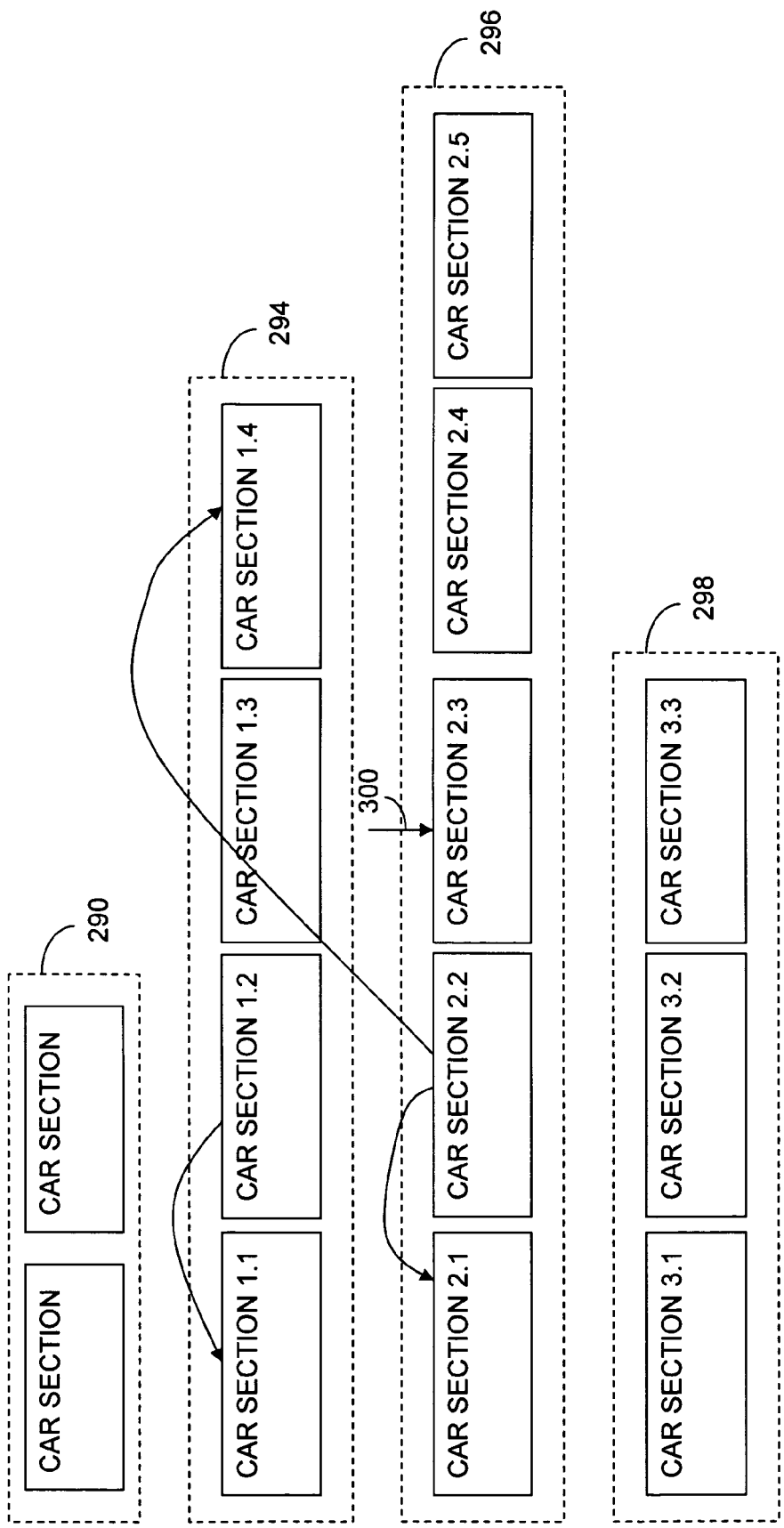
FIG. 20

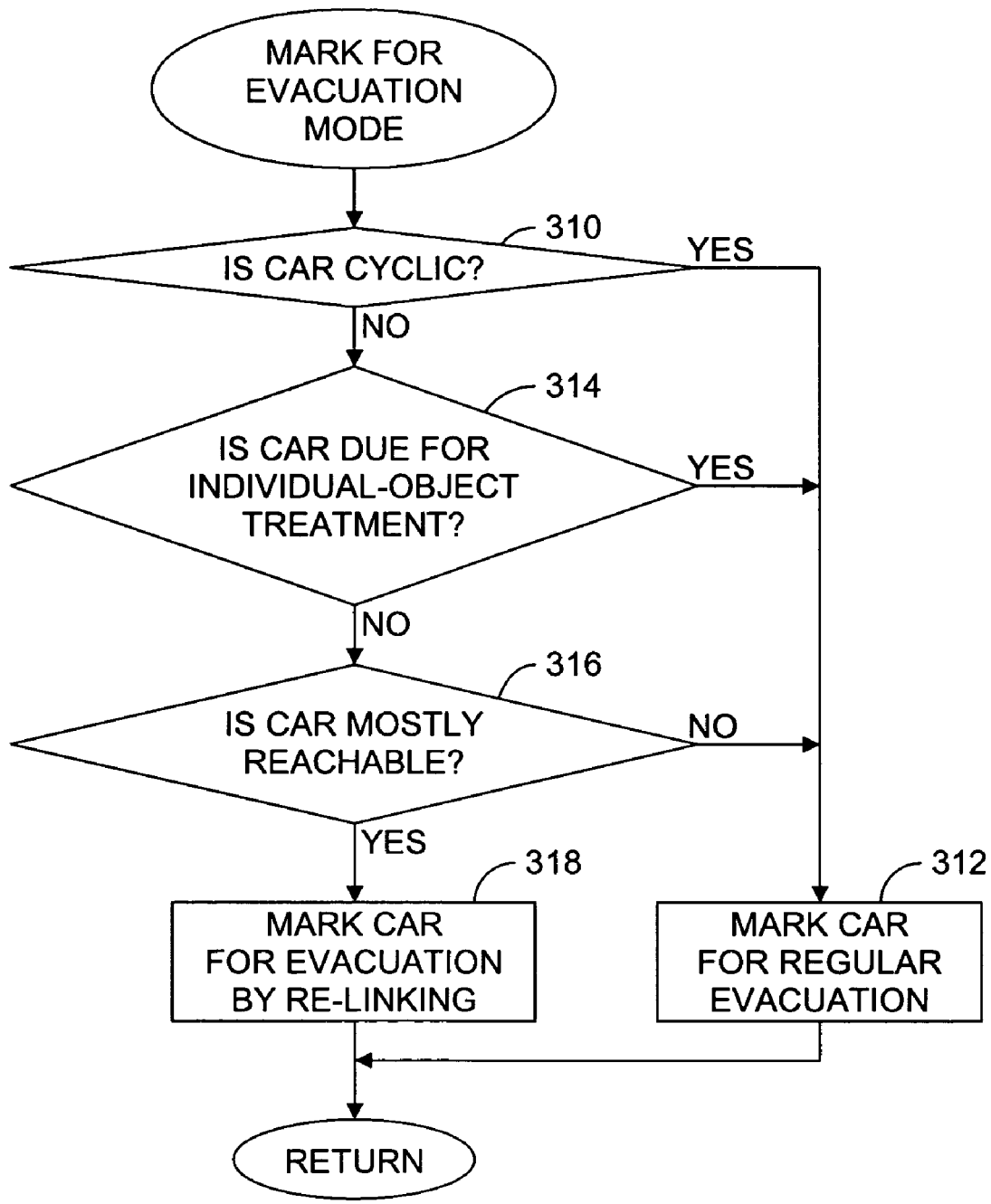
FIG. 21

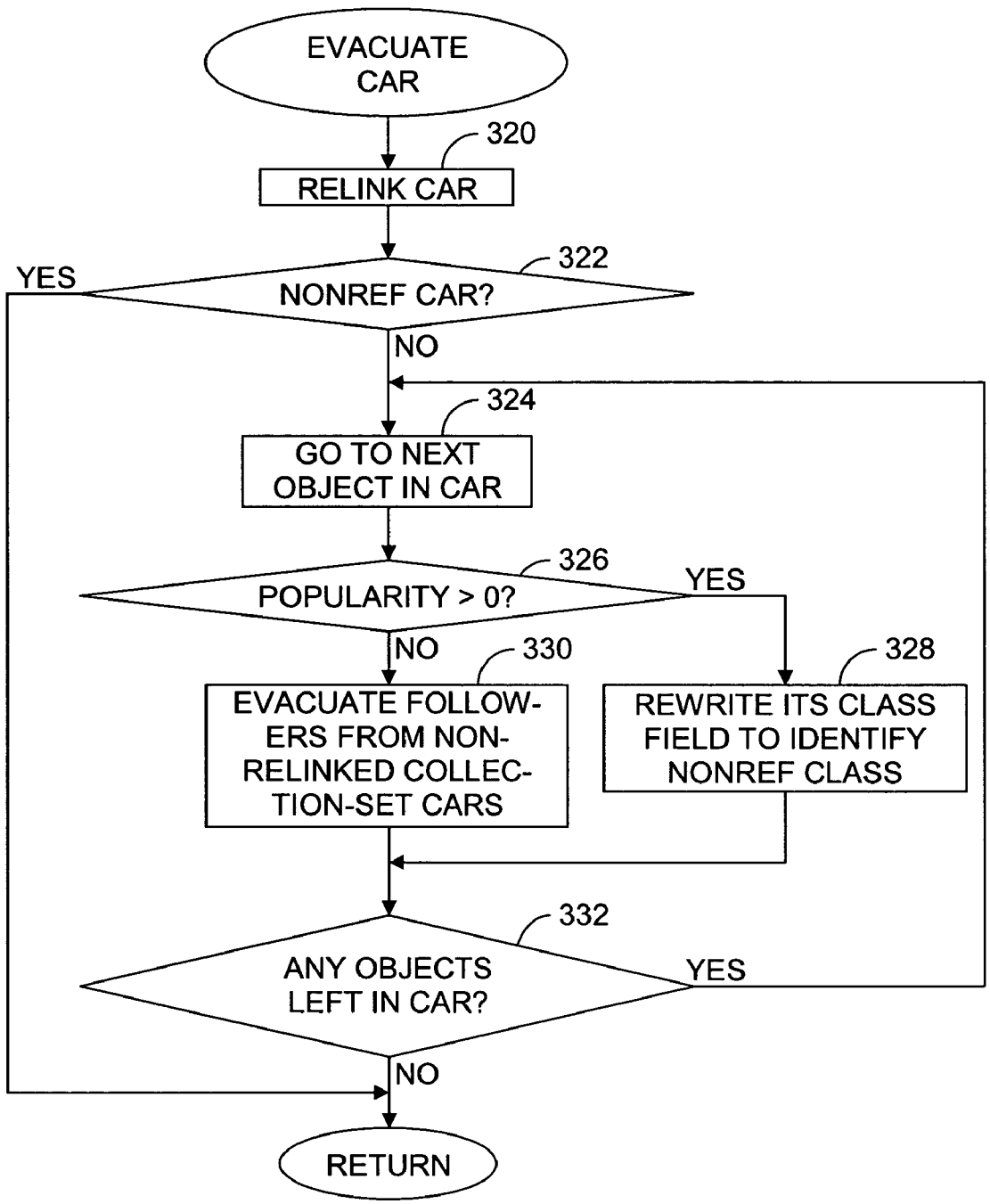
FIG. 22

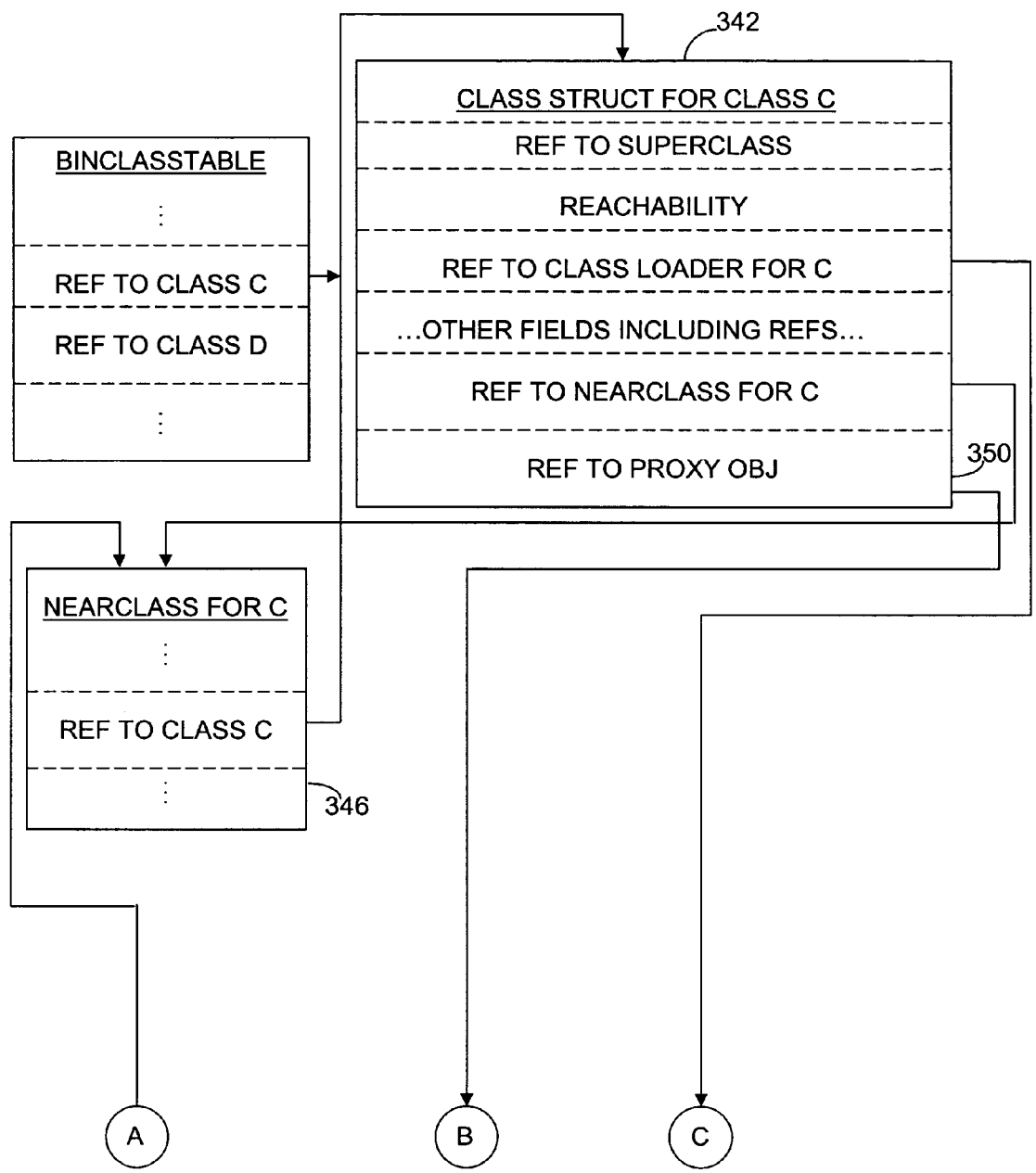
FIG. 23A

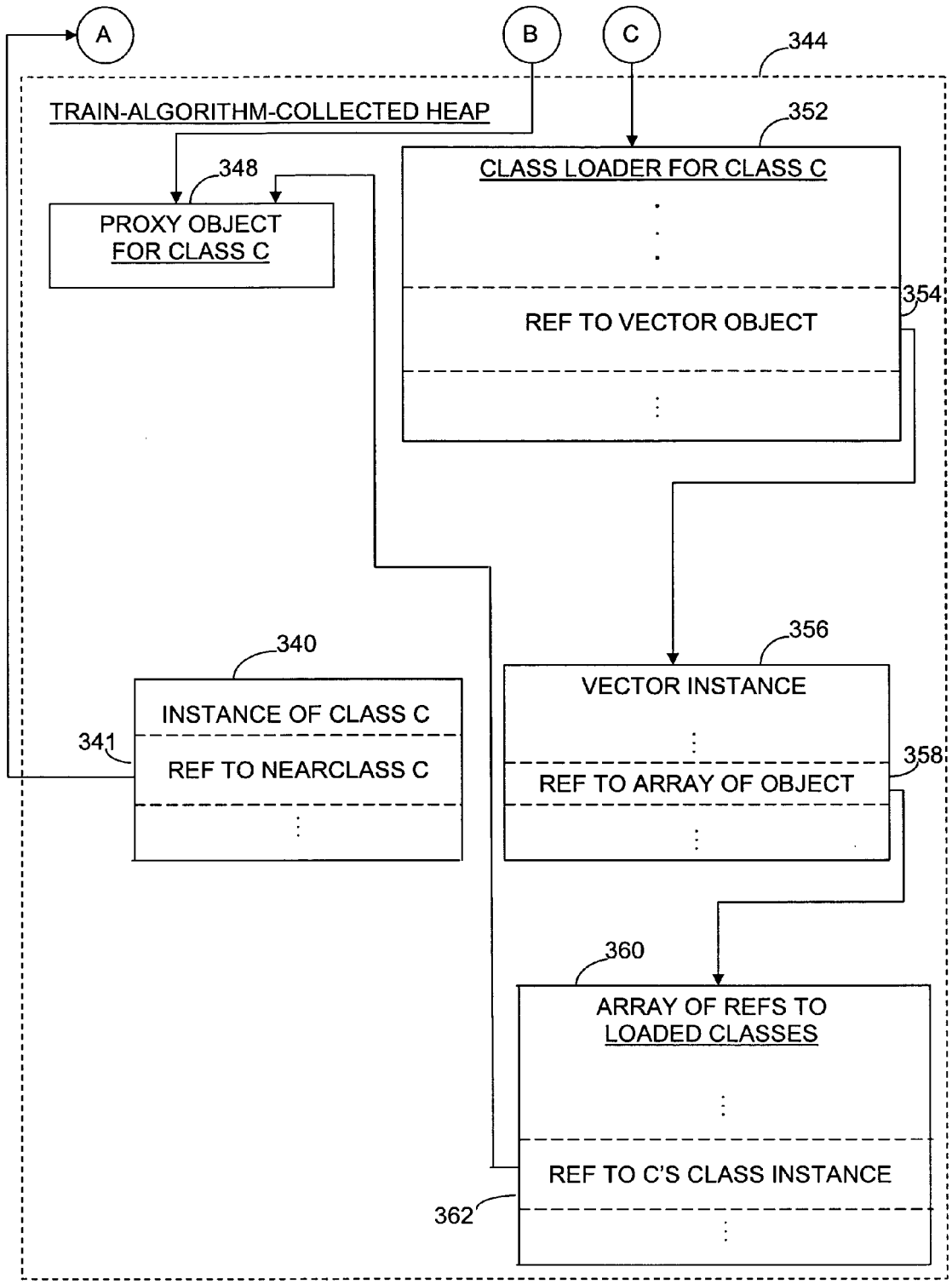
FIG. 23B

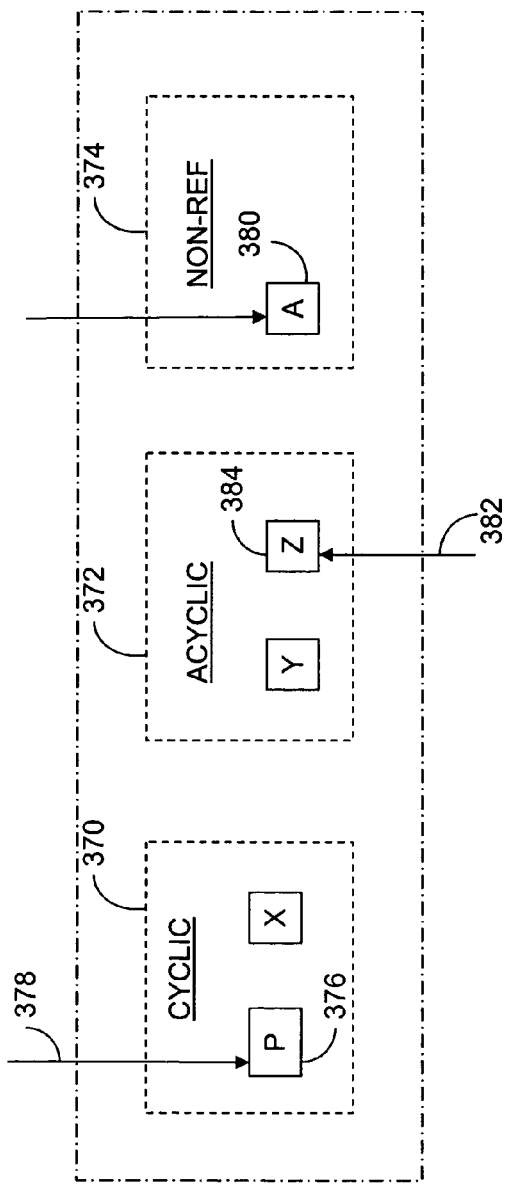
FIG. 24
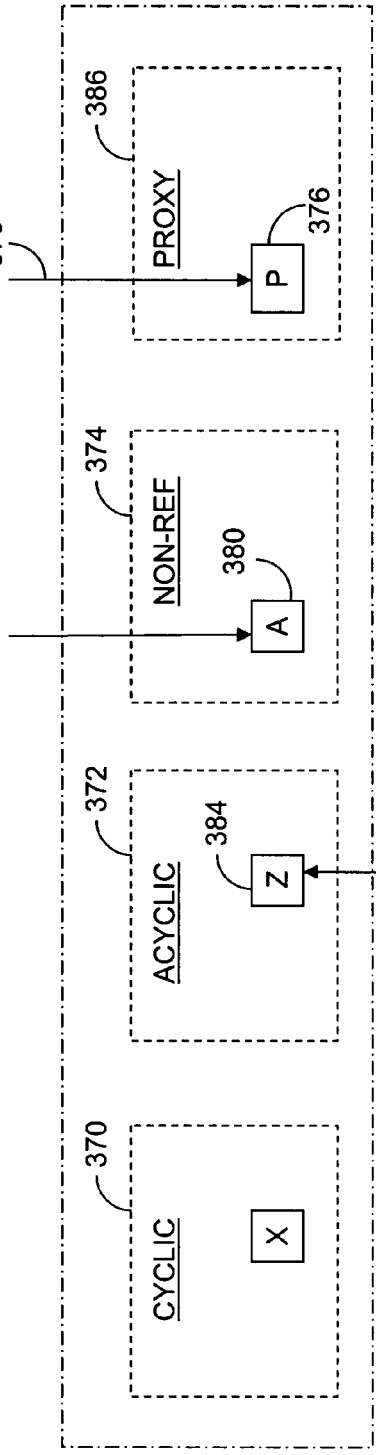
FIG. 25

USING CLASS PROPERTIES TO SEGREGATE OBJECTS IN A GENERATION MANAGED BY THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

An aspect of the invention to be described below concerns reference counting, which finds many uses in garbage collecting. One use arises in garbage-collection approaches that rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero.

But there are other uses for reference counting, too. The specific example in connection with which the present invention's teachings will be explained below is that of accumulating reference counts during a processing of "remembered sets" by a collector that employs the "train algorithm." Most typically, such collectors treat the garbage-collected part of memory as divided into "generations," on not all of which the train algorithm is used. We now turn to a discussion of these concepts to lay the groundwork for the problem that the present invention solves.

In contrast to the simple reference-counting approach just described, collectors that use the train algorithm interleave very few garbage-collector-related instructions into the main mutator process. Instead, they may use separate execution threads to perform some of the garbage-collection work. Or they may interrupt the mutator's operations from time to time for intervals in which they perform most of the garbage-collection operations by which the garbage collector finds unreachable objects and reclaims their memory space for reuse.

The latter approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the is oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as Block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that Block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as Block 107 indicates. The collector may then return control to the mutator, which resumes execution, as FIG. 8B's Block 108 indicates.

If the train contains reachable objects, on the other hand, the collector turns to evacuating potentially reachable objects from the collection set. The first operation, which Block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A-12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to intergenerationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

As the foregoing discussion reveals, incremental collection provides a way of limiting the times required for individual garbage-collection intervals, and the train algorithm provides an advantageous way of recognizing and collecting garbage cycles despite the collection process's incremental nature. Still, the train algorithm does exact some overhead cost. Memory resources must be allocated for the remembered sets, for instance, and remembered-set size can be significant. Additionally, since object evacuation includes a large degree of object copying, it tends to be time-consuming.

SUMMARY OF THE INVENTION

I have developed a way of reducing some such overhead and related draw backs. My invention involves dividing object classes into class groups in accordance with the classes of objects to which the references, if any, in those classes' instances refer. Additionally, the collector associates at least some of the car sections with class groups, and it populates such car sections only with instances of classes that belong to those groups. As will be seen below, thus segregating objects in accordance with the class groups to which they belong can contribute to early recognition of garbage cycles and thus reduce the amount of floating garbage. It also can be used to reduce the memory load that remembered sets impose.

BRIEF DESCRIPTION OF THE DRAWINGS

The invention description below refers to the accompanying drawings, of which:

FIG. 1, discussed above, is a block diagram of a computer system in which the present invention's teachings can be practiced;

FIG. 2 as, discussed above, is a block diagram that illustrates a compiler's basic functions;

FIG. 3, discussed above, is a block diagram that illustrates a more-complicated compiler/interpreter organization;

FIG. 4, discussed above, is a diagram that illustrates a basic garbage-collection mechanism;

FIG. 5, discussed above, is a similar diagram illustrating that garbage-collection approach's relocation operation;

FIG. 6, discussed above, is a diagram that illustrates a garbage-collected heap's organization into generations;

FIG. 7, discussed above, is a diagram that illustrates a generation organization employed for the train algorithm;

FIGS. 8A and 8B, discussed above, together constitute a flow chart that illustrates a garbage-collection interval that includes old-generation collection;

FIG. 9, discussed above, is a flow chart that illustrates in more detail the remembered-set processing included in FIG. 8A;

FIG. 10, discussed above, is a block diagram that illustrates in more detail the referred-to-object evacuation that FIG. 9 includes;

FIGS. 11A and 11B, discussed above, together form a flow chart that illustrates in more detail the FIG. 10 flow chart's step of processing evacuated objects' references;

FIGS. 12A-12J, discussed above, are diagrams that illustrate a collection scenario that can result from using the train algorithm;

FIGS. 13A and 13B together form a flow chart similar to that of 8A and 8B but depicting an algorithm that admits of multiple-car collections sets and incorporates certain optimizations that the algorithm of FIGS. 8A and 8B does not exhibit;

FIG. 14 is a flow chart of a routine that can be used to place an object in a car section associated with a class group to which the object's class belongs;

FIG. 15 is a data-structure diagram that illustrates one way in which an object's class can be identified;

FIG. 16 illustrates one way of maintaining information concerning cars' memberships in respective trains;

FIG. 17 is a diagram depicting references among objects in a train in which objects have not been segregated in accordance with class groups;

FIG. 18 depicts the result of segregating the objects of FIG. 17 in accordance with their class groups;

FIG. 19 is a diagram depicting youngest-car indicators in a generation in which objects are not segregated in accordance with class group;

FIG. 20 is a similar diagram for a generation in which objects are so segregated;

FIG. 21 is a flow chart of a routine for determining the evacuation mode to be used by a garbage collector that sometimes evacuates multiple-object car sections by relinking;

FIG. 22 is a block diagram of a routine that can be employed to perform relinking-type evacuation of an entire car section;

FIGS. 23A and 23B together form a data-structure diagram that illustrates references between in-generation and extra-generation resources in a memory;

FIG. 24 is a diagram depicting a train in which the oldest car includes an object that the collector treats as a proxy for class-type resources located outside the generation; and FIG. 25 depicts the same train after the proxy object has been evacuated.

DETAILED DESCRIPTION OF AN ILLUSTRATIVE EMBODIMENT

As was just mentioned, the present invention involves dividing classes into class groups, associating at least some car sections with respective ones of such groups, and placing into each such car section only instances of classes in the associated group. This concept is broadly applicable to the train algorithm as described above. For the sake of example, though, the invention will now be described by reference to an embodiment that is similar to that described above but differs in some details.

Whereas it was tacitly assumed above, for example, that only a single car section would be collected in any given collection interval, the embodiment now to be discussed may collect more than a single car during a collection interval. FIGS. 13A and 13B (together, "FIG. 13") therefore depict a collection operation that is similar to the one that FIG. 8 depicts, but FIG. 13 reflects the possibility of multiple-car collection sets and depicts certain optimizations that some of the invention's embodiments may employ.

Blocks 170, 172, and 174 represent operations that correspond to those that FIG. 8's blocks 102, 106, and 108 do, and dashed line 176 represents the passage of control from the mutator to the collector, as FIG. 8's dashed line 104 does. For the sake of efficiency, though, the collection operation of FIG. 13 includes a step represented by block 178. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 180 and 182 indicate, the collector then proceeds in reverse-train order to process the entries in all scratch-pad lists but the one associated with the oldest train.

Before the collector processes references in that train's scratch-pad list, the collector evacuates any objects referred to from outside the old generation, as block 184 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, only older generations need to be scanned, and of which there are no older generations in the example; i.e., some embodiments may not require that the young generation be scanned in the block 184 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 186 and 188 indicate.

As block 190 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 192 and 194 indicate. It removes them to younger cars in the oldest train, again updating references, avoiding duplicate evacuations, and evacuating any collection-set objects to which the evacuated objects refer. When this process has been completed, the collection set can be reclaimed, as block 196 indicates, since no remaining object is referred to from outside the collection set: any remaining collection-set object is unreachable. The collector then relinquishes control to the mutator.

We now return to the scratch-pad-list-entry processing represented by FIG. 13's block 182. The processing of such entries can be performed in essentially the manner depicted for remembered-set entries in FIG. 9. As explained above, if an object in the collection set is found to be potentially reachable and has not already been evacuated, the collector may evacuate it, as FIG. 9's block 124 indicates and as was explained above in more detail in connection with FIG. 10. In accordance with the present invention, though, the object-moving step represented by FIG. 10's block 126 depends on the class to which the object being moved belongs. FIG. 14 depicts the decision process that the collector may perform in that connection.

As that drawing's block 200 indicates, the collector begins by determining the class group to which the object's class belongs. The mechanics employed for this purpose will vary among the invention's embodiments, but an approach that FIG. 15 illustrates will likely be typical.

In FIG. 15, in object 202 is depicted as beginning with a header 204, which contains various housekeeping information. Part of that information will typically be an identifier of the object's class. This may, for example, be found in a class field 206 whose contents point to a data that describes features of the object's class. The structures employed for this purpose will vary greatly, but it is not atypical for such a structure to comprise a plurality of separate sets of contiguous fields such as structures 208 and 210.

Field set 208 may, for example, contain the class information that tends to be accessed most often, while set 210, to which set 208's field 212 in refers, contains less-frequently accessed class information. Part of that information will typically be the class's instance format, which fields 214 represent. In the case of the class to which object 202 belongs, for example, such information would indicate that each instance includes two non-reference fields 216 and 218 followed by a single reference field 220. In the case of reference fields, moreover, the format information will identify the class of which the object that reference field 220 refers to is an instance.

Collectors that implement the present invention's teachings will group various classes in accordance with the types of objects to which instances of those classes refer, and groupings will vary among the invention's embodiments. The illustrated embodiment's grouping employs three groups. The first group, which can be thought of as including classes of the lowest "rank," are classes whose instances include no references.

The next, "acyclic" class group, which can be thought of as including classes of a higher rank, includes some final classes whose instances do have references. (A final class is one that cannot be subclassed.) But that group is limited to classes in which the instances' references refer only to instances of classes that belong to the first group and are "final." In the illustrated embodiment, there is only one further group, the "cyclic" group. Every class that does not belong to either of the other two groups belongs to the cyclic group, whose rank is considered the highest.

The illustrated embodiment is intended to be implemented in a Java virtual machine. The virtual machine creates class structures, such as the one represented by contiguous-fields sets 208 and 210, when it loads a class. The class file that the virtual machine reads in order to load a class contains information that indicates whether the class is final and that sets forth the class's instance format. As was just explained, the format information will indicate whether the class's instances include references, and, if so, identify the classes of objects to which those references refer. From this information, the virtual machine can assign the class to a group, and it places an identifier of the class group into some field, such as FIG. 15's field 222, of the class structure that it generates as part of the class-loading operation. In short, the class-group-identifying operation represented by FIG. 14's block 200 can be performed by following the pointer in the class field of the object that the collector is about to evacuate (or allocate or promote). The collector then proceeds to an operation that FIG. 14's blocks 224, 226, and 228 represent. As will presently be explained, that operation places the object in a car section associated with that class group.

Collectors that implement the present invention's teachings will associate at least some car sections with respective class groups. In the illustrated embodiment, all car sections are thus associated, and FIG. 16 illustrates one way of providing such an association. Each train is associated with a train structure, such as structure 230, that contains various information about that train. Included in that information is a way to identify the cars that belong to it. For example, the train structure can include a pointer 232 to a linked list of data structures that contain information about respective ones of the train's car sections. In the illustrated embodiment, there are three such lists, each of which is associated with a respective one of the three class groups described above, but FIG. 16 shows only the list associated with the highest-rank class group. Specifically, the train structure 230's first list pointer 232 points to the first structure 234 in a linked list of such structures. In the illustrated embodiment, the train structure 230 includes not only a pointer 232 to the start of the linked list but also a pointer 236 to the list's last such car structure 238. Typically, the metadata that a structure such as car structure 238 contains will tell where the car section begins, how big it is, and where in that car section the next object to be added should be placed. Structure 238, for example, includes pointers 242 and 244 to the locations where the car section starts and ends, and it includes a further pointer 246 to the location at which the next object to be placed into the car section should start.

So, when the collector reaches the operation that FIG. 14's block 224 represents, it locates the train structure for the train whose scratch-pad list it is currently processing, it finds in that structure the pointer associated with the class group to which the object to be evacuated belongs, and, by comparing the values in the thereby-identified car structure's "limit" and "free" fields 244 and 246 (FIG. 16), it determines whether the car structure includes enough room for the object that is about to be evacuated. If not enough space remains, the collector will add another car to the train, as FIG. 14's block 226 indicates, by linking the car structure for a new car section into the linked list for the object's class group. (Actually, the collector will in some embodiments add a car section to the list even in some situations in which enough room remains in one of the list's existing cars. The collector may do so, for example, if the object to be installed is "popular," i.e., is referred to by a large number of references; there are advantages to giving popular objects their own cars.) As block 228 indicates, the collector then installs the object into the existing or newly allocated car section.

To appreciate some of the benefits of thus segregating objects in accordance with the class groups to which their classes belong, consider FIG. 17, which is a diagram that depicts a train 260 in which objects have not been segregated in this fashion. In that diagram, car section 262 is the "oldest" car section, i.e., the one currently closest to collection, and car sections 264, 266, 268, 270, and 272 are successively younger cars in the same train. The blocks within the car sections represent objects, and arrows between blocks represent references from one object to another.

If, as is conventional, the remembered set for a given car contains entries for references into that car only from younger cars, not from older cars, then there is only one entry in car section's 262's remembered set that represents a reference in the same train: FIG. 17 shows only a single reference from a younger car section into car section 262. FIG. 17 similarly indicates that the numbers of entries in the other cars' remembered sets are two for car section 264, three for car section 266, two for car section 268, one for car section 270, and, since car section 272 is the youngest car section, none for that car section. Although these numbers of remembered-set entrees are small, remembered-set sizes in many practical situations can be quite large, and the resultant memory cost of maintaining remembered sets can contribute significantly to garbage-collection overhead.

That this overhead can be reduced by employing the present invention's teachings can be appreciated by comparing FIG. 17 with FIG. 18. In FIG. 18, train 260 contains the same objects, and they are interconnected in the same manner. But they have been segregated in accordance with class group, and each car section associated with a class group of a given rank has been assigned an "age," i.e., collection precedence, that is higher than that of a car section in the same train associated with a lower-rank class group.

Specifically, car sections 274 and 276 are associated with classes whose instances contain no references. This is the lowest rank, and those car sections have been assigned the lowest age. Car sections 278 and 280 are associated with classes whose references refer only to objects of the lowest rank. They have been assigned higher ages. And car sections 282 and 284 are associated with the class group to which all other classes belong. This class group is considered to have the highest rank, and its cars are the oldest.

A perusal of FIG. 18 reveals that the remembered sets for car sections 274 and 276 will necessarily contain no entries corresponding to references from within the same train. Of course, this is necessarily true for car section 276, since it is the youngest car section. But it is also true for car section 274, since only car sections associated with a higher rank can contain references to its objects, and those are constrained to be older if they are in the same train. For the same reason, the remembered sets associated with car sections 278 and 280 can contain no entries for references in the same train.

In general, therefore, the only remembered sets that can contain contributions corresponding to references in the same train are the remembered sets for car sections associated with the highest-rank class group. Indeed, as FIG. 18 illustrates, the remembered-set associated with the youngest such car section—in this case, car section 284—can have no such contribution, either. So, whereas the number of remembered-set entries for references in the same train is nine for FIG. 17's random object distribution, the object segregation depicted in FIG. 18 results in only a single such entry. This results largely from the fact that assigning ages in accordance with rank makes most of the references within a train point the "right way," i.e., from older cars to younger cars. But some reduction also results from the fact that, since the lowest-rank car sections can contain no references, references tend to be concentrated more into other cars, with the result that more of the references are intra-car references—which do not require remembered-set entries.

In many embodiments, such object segregation affords further advantages, too. As was explained above, one of the tests of the train algorithm is whether there are any references located outside a given train that refer to references inside it. If there are none, then all of the car sections belonging to the train can be reclaimed without processing those sections' remembered sets individually. But some embodiments of the train algorithm will employ more-aggressive approaches to identifying such "dead" car sections, and the present invention can be used to improve the results that their technique can afford.

One such aggressive technique is described in my co-pending U.S. patent application Ser. No. 10/313,878, which was filed on Dec. 6, 2002, for Detection of Dead Regions during Incremental Collection. In that technique, the collector maintains for each car section an identifier of the youngest younger car in which a reference into that car section has previously been found. During a collection increment, all of the cars in at least the oldest trains (and preferably in all of the trains) are treated as forming a single sequence of cars in a collection order from oldest to youngest, and the operation of identifying "dead" cars begins by marking as potentially reachable all cars in that sequence that contain objects to which references located outside the generation refer.

FIG. 19 is a diagram that illustrates how dead cars can be identified. Reference numeral 290 identifies a collection set depicted as containing two car sections. The remainder of the generation's object-containing portion is depicted as organized into three trains 292, 294, and 296. (In train-algorithm discussions, the oldest train is sometimes thought of as including the collection set and sometimes as not including it. FIG. 19 employs the latter approach.) The curved arrows represent respective youngest-car indicators. For instance, curved arrow 298 represents car section 2.3's youngest-car indicator and depicts it as indicating that no car younger than car section 2.5 contains a reference to an object in car section 2.3. Straight arrow 300 represents a mark made to indicate that car section 2.3 contains an object referred to by an external reference, i.e., by a reference located outside the generation. We will assume that car section 2.3 is the oldest car that contains an object potentially referred to by an external reference.

An aggressive collector can use the resultant information to identify "dead" cars. Typically, such cars would be added to the collection set because they are inexpensive to collect; their remembered sets do not need to be processed as part of the collection operation. This approach to identifying dead cars begins with the oldest car that has been marked as externally reachable. In the FIG. 19 scenario, that car section is car section 2.3. Since a reference from outside the generation refers to an object within that car section, the collector cannot, during the current increment, rule out the possibility that car section 2.3 contains reachable objects. Moreover, the collector cannot rule out the reachability of objects in any of the cars younger than car section 2.3, because the potentially reachable objects in car section 2.3 may contain references to objects in those younger cars.

Similarly, car section 2.2 cannot be ruled out as a car section containing reachable objects. As the diagram indicates, its youngest-car indicator indicates that no car section younger than car section 2.4 contains a reference to an object in car section 2.2. Since (externally reachable) car section 2.3 is not younger than car section 2.4, though, there is no way of determining (without actually processing car 2.2's remembered set) whether car section 2.2 contains reachable objects.

The collector also concludes that car sections 2.1 and 1.4 potentially contain reachable objects. This is because car section 1.4's youngest-car indicator indicates that a car as young as car section 2.5 may have a reference to an object in car section 1.4: car section 1.4 may be reachable from (externally reachable) car section 2.3 or some other car section reachable through that externally reachable car section. And, since car section 1.4 may contain a reference to car section 2.1, the reachability of car section 2.1 cannot be ruled out, either. (The absence of a curved arrow directed to the rectangle representing car section 2.1 means that no reference in a younger car section refers to an object in car section 2.1. But that does not mean that no reference in car section 1.4 refers to car section 2.1.)

On the other hand, the youngest-car indicators of car sections 1.1, 1.2, and 1.3 indicate that no reference in a car section younger than car section 1.3 refers to an object in any of those car sections. Consequently, the collector can conclude, without processing those car sections' remembered sets, that they contain no reachable objects. Since their collection will therefore be inexpensive, the aggressive collector may add those car sections to the collection set. Identifying dead cars in this manner therefore improves collector performance.

And a perusal of FIG. 19 reveals that segregating car sections by class group tends to increase the number of dead cars that can thus be identified. To appreciate this, imagine that the externally referred-to object in car section 2.3 is an instance of the lowest, non-reference class or of the next-lowest, acyclic class. If the objects were segregated and the car sections ordered in accordance with the ranks of the class groups which they are associated, the trains of FIG. 19 would likely look more like those of FIG. 20. Since the car ordering prevents objects in cyclic and acyclic cars from being referred to from younger cars in the same train, an external reference to an object in such a car does not prevent any older car in the same train from being recognized as dead. In the scenario that FIG. 20 illustrates, therefore, all cars older than car section 2.3 can be recognized as dead. Moreover, if the externally reachable car were instead a non-reference car, the collector could recognize as dead every car in the entire generation but that one.

Another advantage of thus segregating cars in accordance with their classes arises in embodiments that perform some evacuation by relinking. From the above discussion, it can be appreciated that the evacuation of a "popular" object, i.e., of an object to which a large number of references refer, can be expensive; all of those references need to be updated. Because of this expense, some garbage collectors will identify objects that are popular and will place thus-identified objects into special, single-object cars. Later, when such an object comes up for collection again and is found to have remained popular, its evacuation from the collection set can be performed simply by re-linking its car into the train to which the object should be evacuated. That is, the object's address does not change, so none of the references to it need to change, either.

The popularity determination can be performed as part of the scratch-pad-list generation that was mentioned above in connection with the step that FIG. 13's block 178 represents. As the collector processes each remembered-set entry to identify references into the collection set and to make entries into the scratch-pad list associated with the trains in which the references are thereby found, the collector can increment popularity counts for the objects to which by thereby-found references refer. If a collection-set object's popularity count reaches a predetermined popular-object threshold, that object can be treated as popular; i.e., it can be accorded its own, single-object car.

Such special popular-object handling can be performed independently of whether objects are segregated in accordance with the present invention's teachings. But employing the present invention's teachings can enable the collector profitably to extend the use of re-linking-type evacuation. If certain criteria are met, for example, a collector may evacuate a car by re-linking even if that car contains more than one object and even if some of the objects in the car are known not to be reachable. It turns out that object segregation makes doing so more advantageous.

To understand why this may be so, consider FIG. 21, which is a flow chart of one type of routine that may be performed at, for instance, the end of scratch-pad-list generation to identify collection-set cars that can be re-linked. In this routine, which would typically be performed for every collection-set car, the collector first performs an operation represented by block 310. In this operation, the collector identifies the class group with which the car is associated. If the car is associated with the cyclic group, then the collector marks it, as block 312 indicates, as one that will not be evacuated by re-linking. In that case, the routine simply returns.

Otherwise, the collector proceeds to perform two further tests that may rule out evacuation by re-linking. Block 314 represents one such test. To understand the reason for this test, it helps first to consider the nature of re-linking-type evacuation. A typical approach to such evacuation is to re-link the car into the youngest train containing a reference to an object that the car section contains. As was mentioned above, the purpose of evacuating objects to cars containing references to them is to concentrate entire garbage structures into respective trains and thereby identify such structures as garbage even though they may be too large to fit into respective normal-sized collection sets. But relinking a multiple-object car evacuates all of a car's objects into the same train even if they are not referred to from that train. To a degree, therefore, it compromises progress toward such concentration. If it is performed judiciously, though, the copying cost it avoids outweighs the cost of compromising progress toward garbage-structure concentration. Still, to moderate the adverse effect on garbage-structure concentration, the collector may revert to normal evacuation if the car has already been evacuated more than a certain maximum number of times by re-linking. The test represented by block 314 determines whether the car has already undergone that many re-linking-type evacuations.

If the car has not been re-linked more than the maximum number of times, the collector then determines whether its objects are mostly reachable. The advantage of evacuating by re-linking the car is most pronounced when the volume of objects the collector can thereby avoid copying is large. As the collector scans the object's popularity counts, it notes how many bytes in the car section are occupied by objects whose popularity counts are zero. If the resultant volume exceeds a certain threshold, the collector concludes that evacuation by re-linking is not justified. Block 316 represents making that test.

If the car passes that test—i.e., if more than a certain number of bytes are occupied by objects that have non-zero popularity counts—then the car is marked for relinking, as block 318 indicates. Later, when the scratch-pad lists are processed, that car section's objects will not be evacuated individually. Instead, the car will be re-linked into the youngest train containing a reference to one of that car's objects.

The car may be evacuated, for example, in an operation similar to the one that the flow chart of FIG. 22 depicts. Block 320 represents the operation of re-linking the car into the appropriate train. In accordance with the invention, it would not necessarily be placed at the end of the entire train; it would typically be re-linked to the end of the appropriate "subtrain," i.e., at the end of that train's other cars that contain objects of the same class group. Since the evacuation involves only re-linking, the collector avoids the expense of copying all of the car's reachable objects. Moreover, it avoids the expense of updating references to those objects. Because objects have been segregated in accordance with class group and only the cars containing instances of classes belonging to the non-cyclic class groups have been considered for re-linking, the amount of further processing needed to evacuate the car is minimal.

To appreciate the advantage of re-linking certain types of segregated cars, recall that evacuation, as described above, is normally a recursive process. That is, when a reachable collection-set object is evacuated to a train from which it was referred, any "followers," i.e., any collection-set objects referred to by references that it contains, are evacuated, too. And those followers may themselves have followers, which must also be evacuated, together with their own followers, and so on. In short, an individual object's evacuation may trigger many further evacuations.

Ordinarily, evacuating a car by re-linking may require that some followers be evacuated by copying. Even though the object in the re-linked car does not itself need to be copied into a new car, it may contain a reference to a collection-set object located in a car that will not be re-linked, in which case it will need to be evacuated by copying to another car. But such copying will not be required if the re-linked car is one that contains only non-reference-type objects; since such a car's objects include no references, the car's evacuation triggers no evacuation by copying.

FIG. 22 employs block 322 to represent this fact. That block represents a test to determine whether the car is of the non-reference type. If it is, the re-linking has completed the evacuation operation, as the drawing indicates. Since evacuation by re-linking is so expeditious for non-reference type cars, some embodiments may restrict this type of re-linking of multiple-object cars to those of the non-reference type. As will now be seen, though, segregation affords re-linking-type evacuation certain advantages even in the case of cars whose objects contain references.

If the car is one associated with the illustrated embodiment's acyclic class group, its objects may contain references, and those references need to be processed. In the case of such cars, the collector's evacuation operation enters a loop in which the collector considers each of the car's objects. Block 324 represents finding the next object in the car (which is the first object when the routine first enters that loop), and block 326 represents checking that object's popularity. This test's purpose arises from the following fact: since each object in the car is an instance of a class belonging to the acyclic group, no object in that car is referred to by any other object in that car. Indeed, if the collection set has been so selected as only to include cars of the same, acyclic class group, no object in the collection set is referred to by any other object in the collection set. The illustrated embodiment does so select its collection sets. More specifically, the illustrated embodiment selects each collection set from the oldest sequence of cars of the lowest rank in the oldest train. This means that, if the object's popularity count is zero—i.e., if the object is not directly reachable from outside the collection set—the collector can conclude that the object is not reachable at all. So the collector has identified such an object as unreachable without having had to evacuate other reachable objects and their followers from the car section.

Moreover, as block 328 indicates, the illustrated embodiment performs a "deadwooding" operation. That is, it rewrites the object's class field to a value indicating that the object is of a non-reference type. Since the object is not reachable, this is harmless. Indeed, it is beneficial. Since the unreachable object will remain in a live car, and since it may thereby be located in a card in which the mutator subsequently modifies a reference, allowing that object to be identified as one that contains references could result in the collector's later making unnecessary entries in the remembered sets of cars containing objects to which that (unreachable) object's references refer. By making the unreachable object appear to be, say, an integer array or some other non-reference-containing object, the collector prevents any such unnecessary entries.

Of course, if the collector finds during the block-326 step that the object's popularity is non-zero, it cannot rule out the object's reachability, so it must process the object's references in the normal manner, as block 330 indicates. Still, that operation tends to be inexpensive in the illustrated embodiment, since the only objects to which that object's references can refer are non-reference objects, so the number of possible followers of a given object is limited to the actual number of references that the given object contains.

In any event, the FIG. 22 operation continues, as block 332 indicates, until the collector has considered all of the car's objects.

The approach of evacuating multiple-object cars by re-linking tends to increase collector efficiency, because it reduces the amount of copying that cars containing little garbage would otherwise require. And the present invention's technique of segregating objects in accordance with class groups enables the collector to concentrate that collection technique's use on cars for which the benefit will be greatest.

Of course, the illustrated embodiment's selection of class groups is not the only one that can be employed. Instead of three groups, for example, the collector could employ an arbitrarily large number of groups defined in accordance with rank in a manner similar to that described above for three groups. Instead of one acyclic group, that is, a collector could employ a plurality of acyclic groups of successively higher ranks. There may additionally be an acyclic group that includes all acyclic ranks above some maximum rank. Instances of a class belonging to a given-rank group would contain references to instances of classes in the next-lower-rank group and maybe in groups of lower rank than that, but no instance of any group but the highest-rank group would contain any references to instances of classes in the same or any higher-rank group. As before, the highest-rank group would include any remaining classes.

In principle, there is no need for all classes belonging to lower-rank class groups to be final. The reason for the finality requirement in the illustrated environment is to avoid the complexity in which inheritance can result. To appreciate that complexity, consider a class A, which is ostensibly a member of the acyclic class group. Let us imagine, for instance, that each instance of class A contains only a single reference, that the definition of class A identifies that reference as referring to an object of class N, and that class N's definition includes no references. But suppose that class N is non-final, i.e., that it can be sub-classed. In that case, a program employing an object of class A could load a subclass N' of class N, and subclass N''s definition could include a reference to instances of class A. When the virtual machine loads in class N', the previously acyclic class A becomes cyclic: a reference chain beginning at an instance of class A can include a reference to that instance. So a collector that does not restrict its lower-rank class groups to classes whose instances refer only to instances of final classes must include some mechanism for updating group memberships. To avoid that complication, the illustrated embodiment imposes such a restriction, but some others may not. Even with such a restriction, though, the number of acyclic groups can be greater than the single such group in the illustrated embodiment.

Although all car sections in the illustrated embodiment are associated with class groups, this is not a requirement of all the invention's embodiments. Additionally, there may in some embodiments be different "groups" for the same class. To illustrate why such an approach may be used, we will describe an example of an embodiment that employs the three groups just described as well as a further, fourth group. Perhaps paradoxically, this fourth's group rank will be considered lower even than that of the above-described non-reference group.

The reason why there may be a group whose rank can be lower than that of the non-reference class arises from the fact that some virtual-machine embodiments may employ objects located within the heap as part of the way in which they unload class-related resources ordinarily stored outside the heap. Examples of such virtual machines are those that employ the teachings of U.S. Pat. No. 6,529,919 to Agesen et al. The technique described in that patent is one for incrementally unloading such extra-heap resources, and, as was mentioned above, even "non-reference" objects will ordinarily include class fields, which refer to such resources. FIGS. 23A and 23B (together, "FIG. 23") depict some relationships between such extra-heap resources and objects within the heap.

As was stated above, even a "non-reference" object refers to class-identifying information. To illustrate this, FIG. 23B's typical object 340 contains a reference 341 to information about the class to which it belongs. In a dynamically loaded system, such information typically is initially loaded in units of "class files," from which the virtual generates class structures that contain various information that defines the class. In the illustrated example, most of the information resides in FIG. 23A's structure 342 stored outside of the train-algorithm-managed heap, which FIG. 23B employs reference numeral 344 to identify. Locating such class-information-containing structures outside the train-algorithm-managed heap is typical because the collection procedure uses the that structure's information about object sizes, etc.; relocating the source of that information as part of the relocation process that depends on it would complicate matters. On the other hand, making the class-information structures outside the heap, does it hard to collect some types of objects in an incremental fashion.

To appreciate this, it is helpful to consider a typical way in which class information can be organized. The most-frequently used information is often placed in a relatively small structure exemplified in FIG. 23A shows by "nearClass" structure 346. That structure's location is typically the one that object headers use to identify the objects as instances of the classes that the structure represents. FIG. 23B indicates by showing pointer 341 as pointing to that structure. That is, structures 346 and 342 respectively correspond to FIG. 15's structures 208 and 210. Because of such uses, the nearClass structure, too, is located outside of the heap 344.

But not all of the class-related information is located outside the heap 344. In the case of the Java programming language, for instance, it is a requirement that the programmer be able to refer to a class as an object, so there must be an object structure to represent it. For this purpose, compilers that target the Java virtual machine employ objects of the class java.lang.Class. In FIG. 23B, structure 348 is an instance of that class. Such objects, which the Agesen et al. patent refers to as "proxy objects," should be located in the heap, as other dynamically allocated objects are.

The class structure 342 itself will typically include a reference 350 to the proxy object 348. The proxy object 348 will also be ultimately reachable from a "class loader." A class loader is a structure, exemplified in the drawings by structure 352, that contains information about how to load a class, such as where to look for its class file. For example, the virtual machine seeking to load a given class may look for its class file in the local hard disk if the default loader is specified but instead look to a remote server if a different loader is specified.

The memory allocated to the class-loader structure 352 cannot be reclaimed until the classes loaded in accordance with its contents are no longer reachable, so it contains a list of the classes it has been used to load. The illustrated embodiment implements this feature by a reference 354 to a vector structure 356. In the illustrated embodiment, this structure includes metadata about the vector, including a pointer 358 to structures, such as structure 360, that contain the actual list of references to the classes that the loader has loaded. If the class represented by proxy object 348 has been loaded by the loader that structure 352 represents, then the list-containing structure 360 will include a reference 362 to the proxy object 348.

The problem that references of these types cause is that they can form cycles of references that the conventional train-algorithm implementation does not concentrate. As the diagram illustrates, an object such as object 340 of a given class refers to that class's nearClass structure 346, which refers to the class structure 342, which points to the proxy object 348. Even though such external references conventionally tend to make it appear reachable, the proxy object actually may only be part of an unreachable cycle defined by a reference chain that runs through external space.

The Agesen et al. patent's approach to addressing this problem involves associating proxy objects in the train-managed heap with respective resources outside of it. If all external references to a collection-set object are located in resources associated with proxies in the heap, a virtual machine that uses the Agesen et al. approach will, in essence, evacuate that object to the youngest train containing such a proxy, not the youngest train overall. So objects involved in cycles that include external objects can, like those involved in cycles entirely within the heap, be concentrated in single trains so that their resources are reclaimed by incremental collection. The external resources in the cycle can be reclaimed at the same time.

As the Agesen et al. patent explains in more detail, a way in which to implement this approach involves employing an additional type of remembered set. Specifically, the collector maintains, for each car that contains a proxy object, a separate, "class" remembered set, which contains an entry for each proxy object that resides in that car section. (Actually, the class remembered set may be implemented as a linked list of the class structures for the classes whose proxy objects the car section contains, so the "entries" may be the class structures themselves.) Each entry contains an identifier of the youngest of the generation's trains that contains an instance of the class that the entry represents. When a proxy object's car comes up for collection, the proxy object is evacuated to that train (if no younger train in the generation contains a reference to the proxy object itself). And, when an external reference to some other type of collection-set object is found to be located in a class structure or similar class resource for which the proxy object is intended to be the proxy within the generation, the collection-set object is evacuated to the train that contains the proxy object if there is no basis for evacuating the object to a younger train. (Actually, the collection-set object may in that situation be evacuated instead to the youngest train containing an instance of the object's class, on the theory that, since the class to which an object belongs does not change, the proxy object will eventually need to be placed into that youngest train.)

In any event, the result of that technique is to concentrate a garbage cycle within a train even if the garbage cycle includes extra-generation resources, at least if those resources are class-related.

To appreciate why an embodiment that employs this approach may use cars grouped in a rank lower even than that of the reference cars, consider the situation that FIG. 24 illustrates. In that drawing, each of the oldest train's cars belongs to the oldest train's (for the sake of simplicity, single-car) subtrain 370, 372, or 374. Those subtrains respectively contain objects of the cyclic, acyclic, and non-reference classes. Among the objects in subtrain 370 is a proxy object 376. It is considered for this purpose to be an instance of a cyclic class, because it is the in-generation proxy for an extra-generational class structure that can be cyclically connected. The drawing depicts it as being referred to by an external reference 378. If object 376 is now in the collection set, an external reference such as reference 378 would ordinarily cause it to be evacuated from the collection set and placed into a younger car.

But suppose that object 376 is the proxy for a class, class A, whose definition includes an integer as its only instance member but also includes a static member in the form of a reference to an instance of that same class, class A. Furthermore, suppose that the static member 380 is in the oldest train, too. Its car section belongs to the non-reference subtrain 374 because instances of class A contain no references. Finally, assume that a reference 382 from outside the oldest train refers to object 384 located in a car section that has not yet been collected. Because of that reference, the oldest train cannot be recognized as containing only garbage, at least not before object 384 is evacuated.

Now, in this situation an external reference such as reference 378 would ordinarily result in referred-to object 376's being evacuated from the collection set and being placed in a car belonging to a younger train. In accordance with the Agesen et al. approach, though, the collector takes note of the fact that external reference 378 is located in a class structure. Since it is, the collector evacuates object 376 to a non-collection-set car in the youngest train that contains an instance of the class that proxy object 376 represents. In this case, the only instance of that class is object 380, which is located in car 374. So object 378 should be evacuated from the collection set into another car in the same train.

As was explained above, the class-segregation approach of the present invention would, if object 376 were not a proxy object, mean that the object should be evacuated to another car in the same subtrain rather than to the end of the whole train. That is, since object 376 had been located in a subtrain associated with cyclic classes, it would ordinarily be evacuated to such a subtrain. And proxy objects are indeed evacuated to such subtrains in most cases. But an exception is made in certain special circumstances.

The illustrated scenario gives an example of such circumstances. Sometimes the is only instances of the class represented by the proxy object are located in the oldest train's acyclic or non-reference subtrains. If, when this happens, the only references to the proxy object are located either in class resources or in those subtrains, then the proxy object is evacuated to a new subtrain, one whose rank is considered to be lower than that of the non-reference subtrain. That is, it is evacuated to a subtrain represented by FIG. 25's rectangle 386. And, independently of their classes, any (not-shown) objects referred to by the proxy object are evacuated to that subtrain, too.

The reason for making an exception in a proxy object's placement in such situations is that futile collection could result from following the usual approach of simply evacuating the proxy object to a cyclic subtrain. That is, each time the proxy object ended up in the collection set, it would be evacuated to the end of the oldest car's cyclic subtrain, which would advance to the collection set, and the proxy object would again be evacuated back to the end of the cyclic subtrain: the collector would not progress beyond that subtrain. By placing the instance of the otherwise-cyclic proxy-object class into the special proxy-object car, on the other hand, the collector will have a chance to evacuate from the oldest train any other objects that are keeping the train reachable, and the collector thereby has a chance of recognizing the train's contents—together with the extra-generational resources that the proxy object represents—as garbage.

So the present invention's object-segregation technique can be used in a wide range of embodiments to improve numerous aspects of the collection operation. It therefore constitutes a significant advance in the art.

What is claimed is:

1. A computer system comprising:
   a processor;
   a memory operatively connected to the processor; and
   a garbage collector stored in memory and configured to:
   identify a plurality of objects marked as garbage in a memory heap of the computer system;
   identify a first object of a first object class, a second object of a second object class, and a third object of a third object class from the plurality of objects, wherein the first object comprises a first reference to the second object, wherein the second object comprises a second reference to the third object, and wherein the third object comprises a lack of references to the plurality of objects;
   assign the first object class to a first class group based on the first reference, the second object class to a second class group based on the second reference, and the third object class to a third class group based on the lack of references;
   reserve a first car section of a garbage collection train (GCT) solely for instances of members of the first class group, a second car section of the GCT solely for instances of members of the second class group, and a third car section of the GCT solely for instances of members of the third class group;
   insert the first object into the first car section, insert the second object in the second car section, and insert the third object into the third car section; and
   reclaim a portion of the memory heap for reuse by collecting the first car section.

2. The computer system as defined in claim 1 wherein:
   the garbage collector assigns respective collection-order positions in a nominal collection order from oldest to youngest to the car sections and treats the class groups as having respective ranks within a rank order; and
   the collection-order position that the garbage collector assigns within the GCT to each car section associated with a class group of a given rank is ahead of any car section in the GCT that is associated with a class group of a lower rank.

3. The computer system as defined in claim 2 wherein no instance of any class belonging to a class group of a given rank includes a reference to an object that is an instance of a class belonging to a class group of a higher rank.

4. The computer system as defined in claim 2 wherein the third class group consists of classes whose instances contain no references.

5. The computer system as defined in claim 4 wherein the second class group consists of classes whose instances contain references of which all refer only to objects that contain no references.

6. The computer system as defined in claim 5 wherein no instance of any class belonging to a class group of a given rank includes a reference to an object that is an instance of a class belonging to a class group of a higher rank.

7. The computer system as defined in claim 6 wherein the first class group consists of all classes that do not belong to the second class group or the third class group.

8. The computer system as defined in claim 2 wherein:
   the garbage collector treats certain objects, denominated proxy objects, as proxies for data structures stored outside a generation; and
   the garbage collector associates some car sections with proxy objects,
   wherein the collection-order position that the garbage collector assigns within the GCT to each car section associated with a class group is ahead of the collection-order position that the garbage collector assigns within the GCT to any car section that is associated with proxy objects.

9. The computer system as defined in claim 8 wherein, if the GCT includes a car section associated with proxy objects, at least one such car section includes a proxy object not referred to by references in the generation.

10. The computer system as defined in claim 1 wherein the third class group consists of classes whose instances contain no references.

11. The computer system as defined in claim 10 wherein the second class group consists of classes whose instances contain references of which all refer only to objects that contain no references.

12. The computer system as defined in claim 11 wherein the first class group consists of all classes that do not belong to the second class group or the third class group.

13. A machine readable medium storing instructions to perform garbage collection, the instructions comprising functionality to:
   identify a plurality of objects marked as garbage in a memory heap in a computer system;
   identify a first object of a first object class, a second object of a second object class, and a third object of a third object class from the plurality of objects, wherein the first object comprises a first reference to the second object, wherein the second object comprises a second reference to the third object, and wherein the third object comprises a lack of references to the plurality of objects;
   assign the first object class to a first class group based on the first reference, the second object class to a second class group based on the second reference, and the third object class to a third class group based on the lack of references;

reserve a first car section of a garbage collection train (GCT) solely for instances of members of the first class group, a second car section of the GCT solely for instances of members of the second class group, and a third car section of the GCT solely for instances of members of the third class group;

insert the first object into the first car section, insert the second object in the second car section, and insert the third object into the third car section; and reclaim a portion of the memory heap for reuse by collecting the first car section.

14. The machine readable medium as defined in claim 13, the instructions further comprising functionality to:

assign respective collection-order positions in a nominal collection order from oldest to youngest to the car sections and treat the class groups as having respective ranks within a rank order, wherein the collection-order position assigned within the GCT to each car section associated with a class group of a given rank is ahead of any car section in the GCT that is associated with a class group of a lower rank.

15. The machine readable medium as defined in claim 14 wherein no instance of any class belonging to a class group of a given rank includes a reference to an object that is an instance of a class belonging to a class group of a higher rank.

16. The machine readable medium as defined in claim 14 wherein the third class group consists of classes whose instances contain no references.

17. The machine readable medium as defined in claim 16 wherein the second class group consists of classes whose instances contain references of which all refer only to objects that contain no references.

18. The machine readable medium as defined in claim 17 wherein no instance of any class belonging to a class group of a given rank includes a reference to an object that is an instance of a class belonging to a class group of a higher rank.

19. The machine readable medium as defined in claim 18 wherein the first class group consists of all classes that do not belong to the second class group or the third class group.

20. The machine readable medium as defined in claim 14, the instructions further comprising functionality to:

treat certain objects, denominated proxy objects, as proxies for data structures stored outside a generation; and associate some car sections with proxy objects, wherein the collection-order position assigned within the GCT to each car section associated with a class group is ahead of the collection-order position assigned within the GCT to any car section that is associated with proxy objects.

21. The machine readable medium as defined in claim 20 wherein the GCT includes a car section associated with proxy objects, and at least one such car section includes a proxy object not referred to by references in the generation.

22. The machine readable medium as defined in claim 13 wherein the third class group consists of classes whose instances contain no references.

23. The machine readable medium as defined in claim 22 wherein the second class group consists of classes whose instances contain references of which all refer only to objects that contain no references.

24. The machine readable medium as defined in claim 23 wherein the first class group consists of all classes that do not belong to the second class group or the third class group.

25. A method of garbage collection comprising:

identifying a plurality of objects marked as garbage in a memory heap of a computer system;

identifying a first object of a first object class, a second object of a second object class, and a third object of a third object class from the plurality of objects, wherein the first object comprises a first reference to the second object, wherein the second object comprises a second reference to the third object, and wherein the third object comprises a lack of references to the plurality of objects;

assigning the first object class to a first class group based on the first reference, the second object class to a second class group based on the second reference, and the third object class to a third class group based on the lack of references;

reserving a first car section of a garbage collection train (GCT) solely for instances of members of the first class group, a second car section of the GCT solely for instances of members of the second class group, and a third car section of the GCT solely for instances of members of the third class group;

inserting the first object into the first car section, inserting the second object in the second car section, and inserting the third object into the third car section; and reclaiming a portion of the memory heap for reuse by collecting the first car section.

26. The method as defined in claim 25 further comprising:

assigning respective collection-order positions in a nominal collection order from oldest to youngest to the car sections and treating the class groups as having respective ranks within a rank order, wherein the collection-order assigned within the GCT to each car section associated with a class group of a given rank is ahead of any car section in the GCT that is associated with a class group of a lower rank.

27. The method as defined in claim 26 wherein no instance of any class belonging to a class group of a given rank includes a reference to an object that is an instance of a class belonging to a class group of a higher rank.

28. The method as defined in claim 26 wherein the third class group consists of classes whose instances contain no references.

29. The method as defined in claim 28 wherein the second class group consists of classes whose instances contain references of which all refer only to objects that contain no references.

30. The method as defined in claim 29 wherein no instance of any class belonging to a class group of a given rank includes a reference to an object that is an instance of a class belonging to a class group of a higher rank.

31. The method as defined in claim 30 wherein the first class group consists of all classes that do not belong to the second class group or the third class group.

32. The method as defined in claim 26 further comprising:

treating certain objects, denominated proxy objects, as proxies for data structures stored outside a generation; and associating some car sections with proxy objects, wherein the collection-order position assigned within the GCT to each car section associated with a class group is ahead of the collection-order position that the garbage collector assigns within the GCT to any car section that is associated with proxy objects.

33. The method as defined in claim 32 wherein, if the GCT includes a car section associated with proxy objects, at least one such car section includes a proxy object not referred to by references in the generation.

34. The method as defined in claim 25 wherein the third class group consists of classes whose instances contain no references.

35. The method as defined in claim 34 wherein the second class group consists of classes whose instances contain references of which all refer only to objects that contain no references.

36. The method as defined in claim 35 wherein the first class group consists of all classes that do not belong to the third class group first or the second class group.

* * * * *

UNITED STATES PATENT AND TRADEMARK OFFICE
CERTIFICATE OF CORRECTION

PATENT NO. : 7,620,943 B1  Page 1 of 1
APPLICATION NO. : 10/881101
DATED : November 17, 2009
INVENTOR(S) : Alexander T. Garthwaite It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1540 days.

Signed and Sealed this

Twenty-sixth Day of October, 2010

David J. Kappos
*Director of the United States Patent and Trademark Office*